US010926417B2

(12) United States Patent
Eto et al.

(10) Patent No.: US 10,926,417 B2
(45) Date of Patent: Feb. 23, 2021

(54) HOLDING DEVICE, HANDLING APPARATUS, AND DETECTION DEVICE

(71) Applicant: Kabushiki Kaisha Toshiba, Minato-ku (JP)

(72) Inventors: Haruna Eto, Arakawa (JP); Akihito Ogawa, Fujisawa (JP); Atsushi Sugahara, Kawasaki (JP); Kazuma Komoda, Fuchu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 340 days.

(21) Appl. No.: 15/911,885

(22) Filed: Mar. 5, 2018

(65) Prior Publication Data

US 2019/0077023 A1 Mar. 14, 2019

(30) Foreign Application Priority Data

Sep. 14, 2017 (JP) .............................. JP2017-176866

(51) Int. Cl.
*B25J 13/08* (2006.01)
*B25J 9/16* (2006.01)

(52) U.S. Cl.
CPC ............ *B25J 13/08* (2013.01); *B25J 9/1612* (2013.01); *B25J 9/1697* (2013.01); *Y10S 901/31* (2013.01); *Y10S 901/46* (2013.01); *Y10S 901/47* (2013.01)

(58) Field of Classification Search
CPC ........ B25J 13/08; B25J 9/1612; B25J 9/1697; B25J 9/1692; B25J 9/1689; B25J 5/007; B25J 13/006; B25J 13/081; B25J 13/088; A61B 34/30; A61B 34/37; A61B 1/00193; A61B 34/25; A61B 90/361; A61B 90/37; A61B 34/35; A61B 17/00234; A61B 46/10; A61B 17/0218; A61B 1/00009; A61B 2090/365; A61B 2090/373; A61B 34/10;
(Continued)

(56) References Cited

U.S. PATENT DOCUMENTS 5,871,248 A 2/1999 Okogbaa et al.
6,219,589 B1 * 4/2001 Faraz ................... B25J 9/1689
345/161
(Continued)

FOREIGN PATENT DOCUMENTS

JP 48-3884 1/1973
JP S61-56891 A 3/1986
(Continued)

OTHER PUBLICATIONS

Pitakwatchara et al., Analysis of the Surgery Task for the Force Feedback Amplification in the Minimally Invasive Surgical System, 2006, IEEE, p. 829-832 (Year: 2006).*
(Continued)

*Primary Examiner* — McDieunel Marc
(74) *Attorney, Agent, or Firm* — Oblon, McClelland, Maier & Neustadt, L.L.P.

(57) ABSTRACT

According to one embodiment, a holding device includes a first holder and a first sensor. The first holder includes a first member and a second member. The first holder is configured to hold an object by interposing the object between the first member and the second member. The first sensor is in the first member. The first sensor is configured to detect a vibration.

19 Claims, 14 Drawing Sheets

(58) Field of Classification Search
CPC ......... A61B 34/70; A61B 34/74; A61B 34/76;
A61B 17/0483; A61B 1/3132; A61B
2034/742; A61B 18/1445; A61B 1/0016;
A61B 2017/0488; A61B 2017/0496;
A61B 2034/252; A61B 2505/05; A61B
17/32; A61B 17/3201; A61B 17/3478;
A61B 17/4241; A61B 18/1402; A61B
1/00087; A61B 2562/0247; A61B 5/4519;
Y10S 901/31; Y10S 901/46; Y10S
901/47; Y10S 901/41; G06T 2200/24;
G06T 2207/10068; G06F 3/167; G06F
16/60; G16H 40/63; G16H 40/67; G09B
19/24; H04N 21/4223; B60R 11/04
See application file for complete search history.

(56) References Cited

U.S. PATENT DOCUMENTS

| | | | | |
|---|---|---|---|---|
| 6,594,552 | B1 * | 7/2003 | Nowlin | B25J 9/1689 |
| | | | | 700/260 |
| 6,728,599 | B2 * | 4/2004 | Wang | A61B 34/70 |
| | | | | 128/897 |
| 6,839,612 | B2 * | 1/2005 | Sanchez | A61B 34/37 |
| | | | | 700/245 |
| 6,889,116 | B2 * | 5/2005 | Jinno | B25J 3/04 |
| | | | | 600/130 |
| 6,999,852 | B2 * | 2/2006 | Green | A61B 1/00193 |
| | | | | 700/245 |
| 7,142,945 | B2 * | 11/2006 | Wang | B25J 5/007 |
| | | | | 700/245 |
| 7,379,790 | B2 * | 5/2008 | Toth | A61B 34/30 |
| | | | | 700/245 |
| 7,386,365 | B2 * | 6/2008 | Nixon | B25J 9/1692 |
| | | | | 700/245 |
| 2014/0035306 | A1 | 2/2014 | Garcia et al. | |

FOREIGN PATENT DOCUMENTS

| | | |
|---|---|---|
| JP | 9-123078 | 5/1997 |
| JP | 9-225881 | 9/1997 |
| JP | 2002-166383 | 6/2002 |
| JP | 3634194 | 3/2005 |
| JP | 2014-508659 | 4/2014 |

OTHER PUBLICATIONS

Mack, Minimally Invasive and Robotic Surgery, 2001, Internet, p. 568-572 (Year: 2001).*

Wapler et al., Controlling Miniature Robotic Systems in Minimally Invasive Surgery, 1994, Internet, Internet, p. 711- (Year: 1994).*

Stone et al., Clinical review Ergonomics in medicine and surgery, 2004, IEEE, p. 1115-1118 (Year: 2004).*

Cleary et al., State of the Art in Surgical Robotics: Clinical Applications and Technology Challenges, 2001, Iinternet, p. 1-26 (Year: 2001).*

Yang Fu, et al. "Analysis of Feature Extracting Ability for Cutting State Monitoring Using Deep Belief Networks", CIRP, vol. 31, 2015, pp. 29-34.

Tomoaki Yoshikai, et al. "Slip detecting by tactile sensor using Acoustic Resonant Tensor Cell and its application for grasping", JRSJ, vol. 20, No. 8, 2002, pp. 868-875 (with Computer Generated English Translation).

* cited by examiner

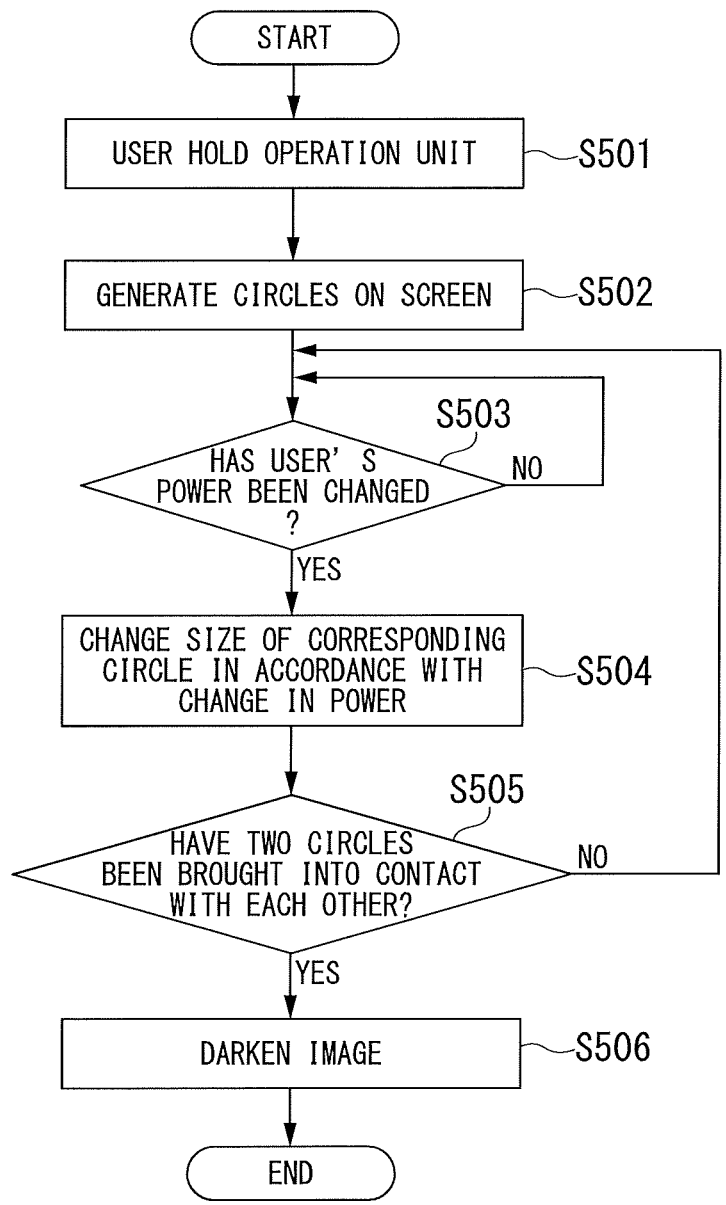

HOLDING DEVICE, HANDLING APPARATUS, AND DETECTION DEVICE

CROSS-REFERENCE TO RELATED APPLICATION

This application is based upon and claims the benefit of priority from Japanese Patent Application No. 2017-176866 filed on Sep. 14, 2017, the entire contents of which are incorporated herein by reference.

FIELD

Embodiments described herein relate generally to a holding device, a handling apparatus, and a detection device.

BACKGROUND

A Holding device and a handling apparatus including a holder which holds an object are known. By the way, improvement in an object holding ability of the holding device is desired.

BRIEF DESCRIPTION OF THE DRAWINGS

FIG. 19 is a flowchart showing one example of a flow of training performed by the training device of the reference embodiment.

DETAILED DESCRIPTION

Figure 1:
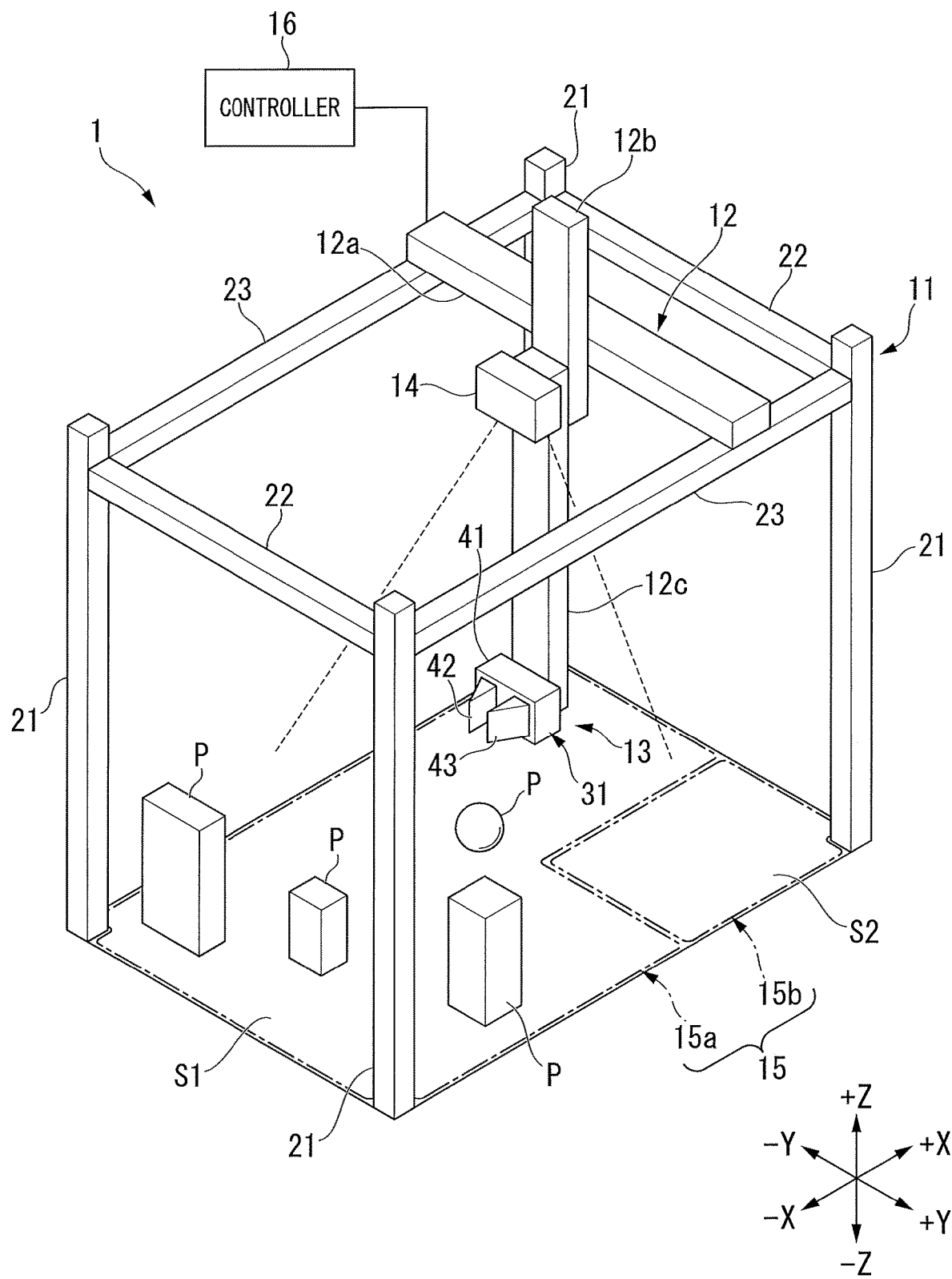
FIG. 1 is a perspective view showing a handling apparatus according to a first embodiment.

According to one embodiment, a holding device includes a first holder and a first sensor. The first holder includes a first member and a second member. The first holder is configured to hold an object by interposing the object between the first member and the second member. The first sensor is in the first member. The first sensor is configured to detect a vibration.

Hereinafter, a holding device, a handling apparatus, and a detection device according to embodiments will be described with reference to the drawings. In description presented below, same reference numerals will be attached to configurations having the same or similar functions. A duplicate description of the configurations may be omitted. In the specification, the term "based on XX" represents "based at least on XX" and includes the case of being based on any other element in addition to XX. In addition, the term "based on XX" is not limited to "based directly on XX", but also represents "based on something that is acquired by an arithmetic operation or other process being performed on XX". Here, "XX" is an arbitrary element (for example, arbitrary information).

First Embodiment

A first embodiment will be described with reference to FIGS. 1 to 10. FIG. 1 is a perspective view showing a handling apparatus 1 according to the first embodiment. Here, a "handling apparatus" broadly means a device that moves an object (for example, an item or a moving target) P.

Examples of the handling apparatus 1 include an automatic unloading apparatus and a picking apparatus. In this embodiment, the handling apparatus 1 takes out an object P present in a first area T1 and moves the taken-out object P to a second area T2. In the first area T1, for example, a tray (i.e., pallet), a truck, a belt conveyer, or the like on which an object P is loaded, is arranged. In the first area T1, for example, a plurality of objects P having different sizes and shapes are irregularly placed. However, in the first area T1, objects P of the same kind may be regularly placed. In the second area T2, for example, another tray, truck, belt conveyer, or the like is arranged.

An object P handled by the handling apparatus 1 is not limited to a packaged load and may be a component in a manufacturing line or the like. The handling apparatus 1 according to this embodiment can be broadly applied to an automatic input apparatus of distribution, an article supply apparatus of a factory, and the like. The handling apparatus 1 may be also referred to as an "object transferring apparatus," a "robot apparatus," or the like.

Here, for the convenience of description, a +X direction, a −X direction, a +Y direction, a −Y direction, a +Z direction, and a −Z direction will be defined. The +X direction, the −X direction, the +Y direction, and the −Y direction, for example, are directions that are substantially along a horizontal plane. −X direction is a direction opposite to +X direction. In a case in which the +X direction and the −X direction do not need to be distinguished from each other, the directions will be simply referred to as an "X direction." The +Y direction and the −Y direction are directions intersecting the X direction (for example, directions substantially orthogonal thereto). The −Y direction is a direction opposite to the +Y direction. In a case in which the +Y direction and the −Y direction do not need to be distinguished from each other, the directions will be simply referred to as a "Y direction." The +Z direction and the −Z direction are directions intersecting the X direction and the Y direction (for example, directions that are substantially orthogonal thereto) and, for example, are vertical directions. The −Z direction is a direction opposite to the +Z direction. In a case in which the +Z direction and the −Z direction do not need to be distinguished from each other, the directions will be simply referred to as a "Z direction."

As illustrated in FIG. 1, the handling apparatus 1, for example, includes a frame 11, a moving mechanism 12, a holding device 13, an image sensor 14, a loading sensor 15, and a controller 16.

The frame 11, for example, is installed on a floor face. The frame 11 includes a plurality of support columns 21, two support members 22, and two guides 23. The plurality of support columns 21 extend in the Z direction. The two support columns 22 are supported by the plurality of support columns 21 and extend in the Y direction. The two guides 23 are supported by the plurality of support columns 21 and extend in the X direction.

The moving mechanism 12, for example, is an articulated arm. In this embodiment, the moving mechanism 12 includes a first arm member 12a, a second arm member 12b, and a third arm member 12c and a plurality of motors, which are not illustrated in the drawing, driving these. The first arm member 12a is supported by the guide 23 and can move in the +X direction and the −X direction. The second arm member 12b is supported by the first arm member 12a and can move in the +Y direction and the −Y direction. The third arm member 12c is supported by the second arm member 12b and can move in the +Z direction and the −Z direction. In other words, the first arm member 12a, the second arm member 12b, and the third arm member 12c form orthogonal arms of three axes and move the holding device 13 to a desired position in the X direction, the Y direction, and the Z direction. Here, the moving mechanism 12 is not limited to the orthogonal arms of three axes and may be an articulated arm having a plurality of rotary shafts and moving the holding device 13 or any other mechanism.

The holding device 13 is a holder holding an object P in a case in which the handling apparatus 1 moves the object P. The holding device 13, for example, is attached to a lower end of the third arm member 12c. The holding device 13 will be described later in detail.

The image sensor 14 acquires image data of an object P and a handling environment (including the first area T1 and the second area T2) for moving the object P. For example, the image sensor 14 is a camera imaging the object P and the handling environment from the above. The image sensor 14 may be attached to an upper end of the third arm member 12c or may be attached to the first arm member 12a, the second arm member 12b, the frame 11, or the like. The image sensor 14 may be a general optical camera or an infrared camera. A detection result acquired by the image sensor 14 is output to the controller 16.

The loading sensor 15 acquires the loading amount of an object P in at least one of the first area T1 and the second area T2. For example, the loading sensor 15 includes a first weight detector 15a and a second weight detector 15b. The first weight detector 15a is arranged in the first area T1 and detects the weight of an object P that is present in the first area T1. The second weight detector 15b is arranged in the second area T2 and detects the weight of an object P that is present in the second area T2. A detection result acquired by the loading sensor 15 is output to the controller 16.

The controller 16 controls the overall operation of the handling apparatus 1. For example, the controller 16 recognizes an object P on the basis of a detection result D acquired by the image sensor 14. By controlling the holding device 13, the controller 16 holds an object P using the holding device 13. By controlling the moving mechanism 12, the controller 16 moves the holding device 13 holding the object P to a desired position. The controller 16 recognizes lifting-up or landing of the object P in the first area T1 or the second area T2 on the basis of a detection result acquired by the loading sensor 15. The controller 16 will be described later in detail.

Figure 2:
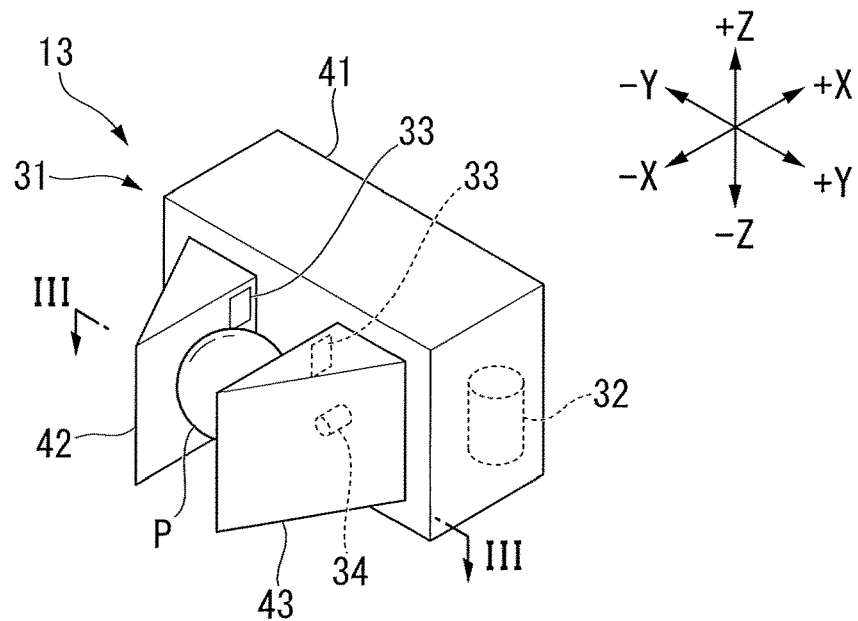
FIG. 2 is a perspective view showing a holding device according to the first embodiment.

Next, the holding device 13 will be described. FIG. 2 is a perspective view showing the holding device 13. The holding device 13, for example, includes a holder 31, a driver 32, a pressure sensor 33, and an internal sensor 45.

The holder 31 is one example of "first holder." The holder 31, for example, includes a main body 41, a first member 42, and a second member 43.

The main body 41 is attached to the lower end of the third arm member 12c. However, the main body 41 may be formed integrally with the third arm member 12c. The main body 41, for example, is formed in a box shape and houses the driver 32.

The first member 42 is attached to the main body 41 and is supported by the main body 41. The first member 42 is driven by the driver 32 and can be moved in the +Y direction and the −Y direction with respect to the main body 41. The first member 42 has a rigidity. Here, "having a rigidity" means having a difficult-to-deform characteristic. Here, "having a rigidity" also includes a case in which slight elastic deformation (for example, elastic deformation transferring a vibration to be described later) is allowed. In this embodiment, the first member 42 has such a rigidity that a vibration caused on the surface of the first member 42 is transferred to the inside of the first member 42. The first member 42 is formed of a hard material (for example, a hard material allowing a sound to echo). For example, the first member 42 is formed of at least one of a hard synthetic resin, metal, and wood.

The second member 43 is attached to the main body 41 and is supported by the main body 41. The second member 43 is driven by the driver 32 and can be moved in the +Y direction and the −Y direction with respect to the main body 41. In this embodiment, the second member 43 is formed of the same material as that of the first member 42 and has a rigidity.

The driver 32, for example, is a motor and drives at least one of the first member 42 and the second member 43. In this embodiment, the driver 32 is connected to the first member 42 and the second member 43 and can drive the first member 42 and the second member 43 in a direction for approaching each other and a direction for separating each other. Accordingly, by interposing an object P between the first member 42 and the second member 43, the holder 31 holds the object P. In addition, the driver 32 can drive the first member 42 and the second member 43 such that the magnitude of a force of the holder 31 for holding the object P is changed. In addition, instead of moving the first member 42 and the second member 43 in the Y direction, by rotating at least one of the first member 42 and the second member 43 around an axial line extending in the Z direction, the driver 32 may interpose the object P between the first member 42 and the second member 43.

The pressure sensor 33 detects a reaction force received by the first member 42 and the second member 43 from an object P in a case in which the object P is interposed between the first member 42 and the second member 43. For example, the pressure sensor 33 is a strain gauge attached to the first member 42 or the second member 43 but is not limited thereto.

The internal sensor 34 is disposed inside at least one of the first member 42 and the second member 43. In this embodiment, the internal sensor 34 is disposed inside each of the first member 42 and the second member 43. These internal sensors 34 are pressure sensitive sensors detecting vibrations inside the first member 42 and the second member 43. The internal sensors will be described later in detail.

Figure 3:
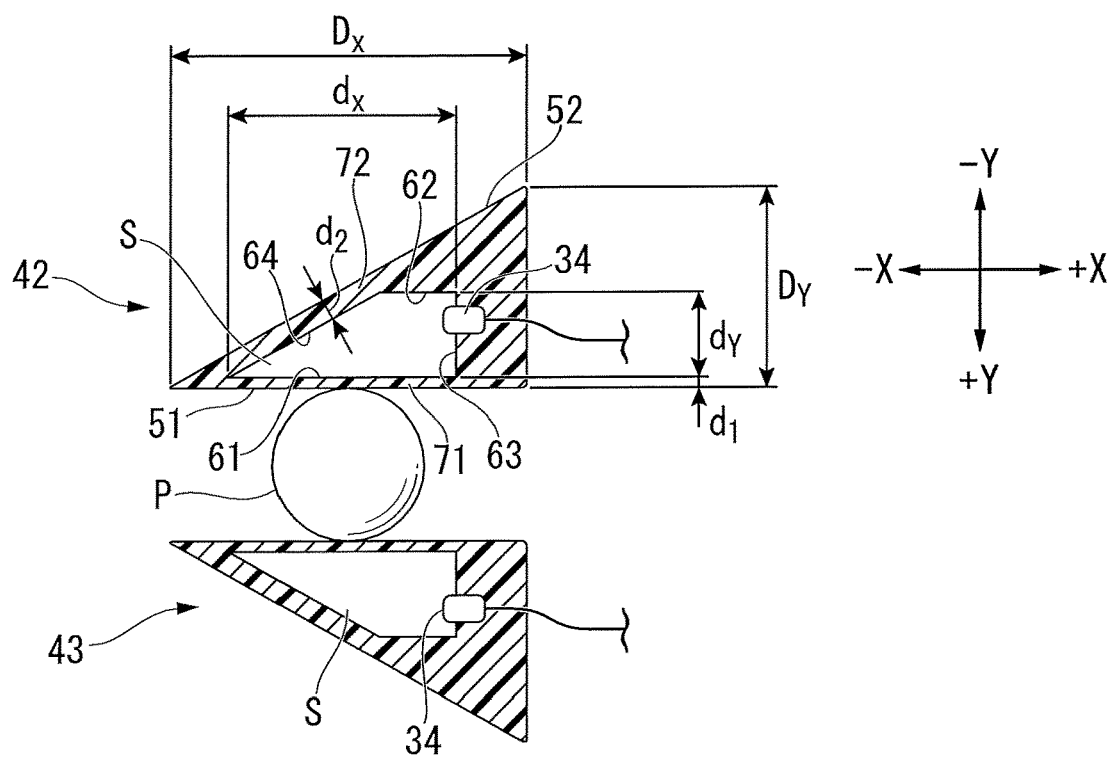
FIG. 3 is a cross-sectional view of a first member and a second member taken along line III-III shown in FIG. 2.

Next, the internal structures of the first member 42 and the second member 43 will be described. FIG. 3 is a cross-sectional view of the first member 42 and the second member 43 taken along line III-III illustrated in FIG. 2. Here, the second member 43 and the internal sensor 34 disposed on the inside thereof are substantially the same as the first member 42 and the internal sensor 34 disposed on the inside thereof. For this reason, hereinafter, the first member 42 and the internal sensor 34 disposed on the inside thereof will be representatively described.

First, the first member 42 will be described. The first member 42 includes a first face (i.e., first outer face) 51 and a second face (i.e., second outer face) 52 as outer surfaces of the first member 42. The first face 51 is formed in a planar shape extending in the X direction and the Z direction. The first face 51 faces the second member 43 and an object P and supports the object P (i.e., in contact with the object P). When the object P rubs the holder 31 so as to fall therefrom or a positional deviation therefrom occurs (hereinafter, these will be collectively referred to as "deviating"), a vibration occurs on the first face 51 in accordance with a contact between the first face 51 and the object P.

The first face 51, for example, is formed to have high surface roughness. In a case in which the surface roughness of the first face 51 is high, when the object P deviates, a larger vibration occurs on the first face 51. For example, the first face 51 has surface roughness that is high than that of at least part of the holder 31. The first face 51 may have surface roughness higher than that of the second face 52 or first to fourth inner faces 61, 62, 63, and 64 to be described later. For example, the first face 51 has a roughness of 100 nm or more as arithmetic average roughness (Ra) set in Japanese Industrial standards.

The second face 52 is formed in a planar shape extending in the Z direction. The second face 52 is in a direction different from that of the first face 51. The second face 52 is positioned on a side opposite to the object P with respect to the first face 51.

In this embodiment, the first member 42 has an internal space S. This internal space S is a resonance space that amplifies a vibration caused on the surface (for example, the first face 51) of the first member 42 through resonance. The internal space S, for example is filled with a gas (for example, air). In this embodiment, the internal space S is sealed. When the internal space S is sealed, it is difficult for an external sound (i.e., noise) to enter the internal space S. Here, the first member 42 may have a hole allowing the internal space S to communicate with the outside. The internal space S, for example, has a shape along the first face 51 and the second face 52 of the first member 42. However, the internal space S is not limited to the shape described above and may be in an arbitrary shape.

The internal space S occupies a relative large area inside the first member 42. For example, a maximum width $d_X$ of the internal space S in the X direction is a half or more of a maximum width $D_X$ of the first member 42 in the X direction. A maximum width $d_Y$ of the internal space S in the Y direction is a half or more of a maximum width $D_Y$ of the first member 42 in the Y direction. In addition, from a different viewpoint, the maximum width $d_X$ of the internal space S in the X direction is twice a maximum length of the internal sensor 34 to be described later in the X direction or more. The maximum width $d_Y$ of the internal space S in the Y direction is twice a maximum width of the internal sensor 34 in the Y direction or more. The maximum width $d_Y$ of the internal space S in the Y direction is a distance defining a main resonance frequency. For example, in a case in which the maximum width $d_Y$ of the internal space S in the Y direction is 3 cm, the resonance frequency is 1 kHz. In a case in which the maximum width $d_Y$ of the internal space S in the Y direction is 1.5 cm, the resonance frequency is 500 Hz. For this reason, the maximum width $d_Y$ of the internal space S in the Y direction may be set in accordance with the main purpose of the use (e.g., an object P to be held) of the handling apparatus 1.

The first member 42 includes four inner faces 61, 62, 63, and 64 defining the internal space S. The first inner face 61 is substantially in parallel with the first face 51. The second inner face 62 is positioned on a side opposite to the first inner face 61 in the internal space S. The third inner face 63 connects first ends of the first inner face 61 and the second inner face 62. The fourth inner face 64 is positioned on a side opposite to the third inner face 63 in the internal space S. The fourth inner face 64 connects second ends of the first inner face 61 and the second inner face 62.

The first member 42 includes a first wall 71 and a second wall 72. The first wall 71 is a wall defined between the first face 51 and the first inner face 61. The second wall 72 is a wall defined between the second face 52 and the second inner face 62. In this embodiment, a thickness (in other words, a first thickness $d_1$ between the first face 51 and the internal space S) of the first wall 71 is smaller than a thickness (in other words, a second thickness $d_2$ between the second face 52 and the internal space S) of the second wall 72. Accordingly, the first wall 71 can be vibrated more easily than the second wall 72. From a different viewpoint, a vibration of the first face 51 can be easily transferred to the gas contained in the internal space S. Here, the first thickness $d_1$ may be the same as the second thickness $d_2$ or may be larger than the second thickness $d_2$.

Next, the internal sensor 34 will be described. The internal sensor 34 is one example of "first sensor." The internal sensor 34 is disposed inside the first member 42 and is not exposed to the outside of the first member 42. The internal sensor 34 detects a vibration caused inside the first member 42 due to a vibration caused on the surface (for example, the first face 51) of the first member 42. In this embodiment, at least part of the internal sensor 34 is arranged in the internal space S. The internal sensor 34 detects a vibration caused inside the internal space S. For example, the internal sensor 34 detects a vibration of a gas (for example, air) contained in the internal space S. For example, the internal sensor 34 is a microphone and detects a vibration of the gas inside the internal space S as a sound. A "sound" described here is not necessarily limited to a sound wave having a frequency within a human's audible region and means an arbitrary elastic wave propagating though an elastic body (a gas such as the air, a liquid, or a solid). The internal sensor 34, for example, can detect low pressure of about 1/1,000,000 [Pa].

As illustrated in FIG. 3, the internal sensor 34 is attached to the third inner face 63 inside the internal space S. Here, "being attached to the third inner face" includes a case in which the internal sensor 34 is housed in a hole or a cavity formed in the third inner face 63. In other words, the internal sensor 34 is separated from the first inner face 61, the second inner face 62, and the fourth inner face 64. Accordingly, the internal sensor 34 can detect a sound reflected on the first inner face 61 and the second inner face 62 more effectively. Here, the attachment position of the internal sensor 34 is not limited to that illustrated in the example described above. The internal sensor 34 may be attached to the first inner face 61, the second inner face 62, or the fourth inner face 64.

Figure 4:
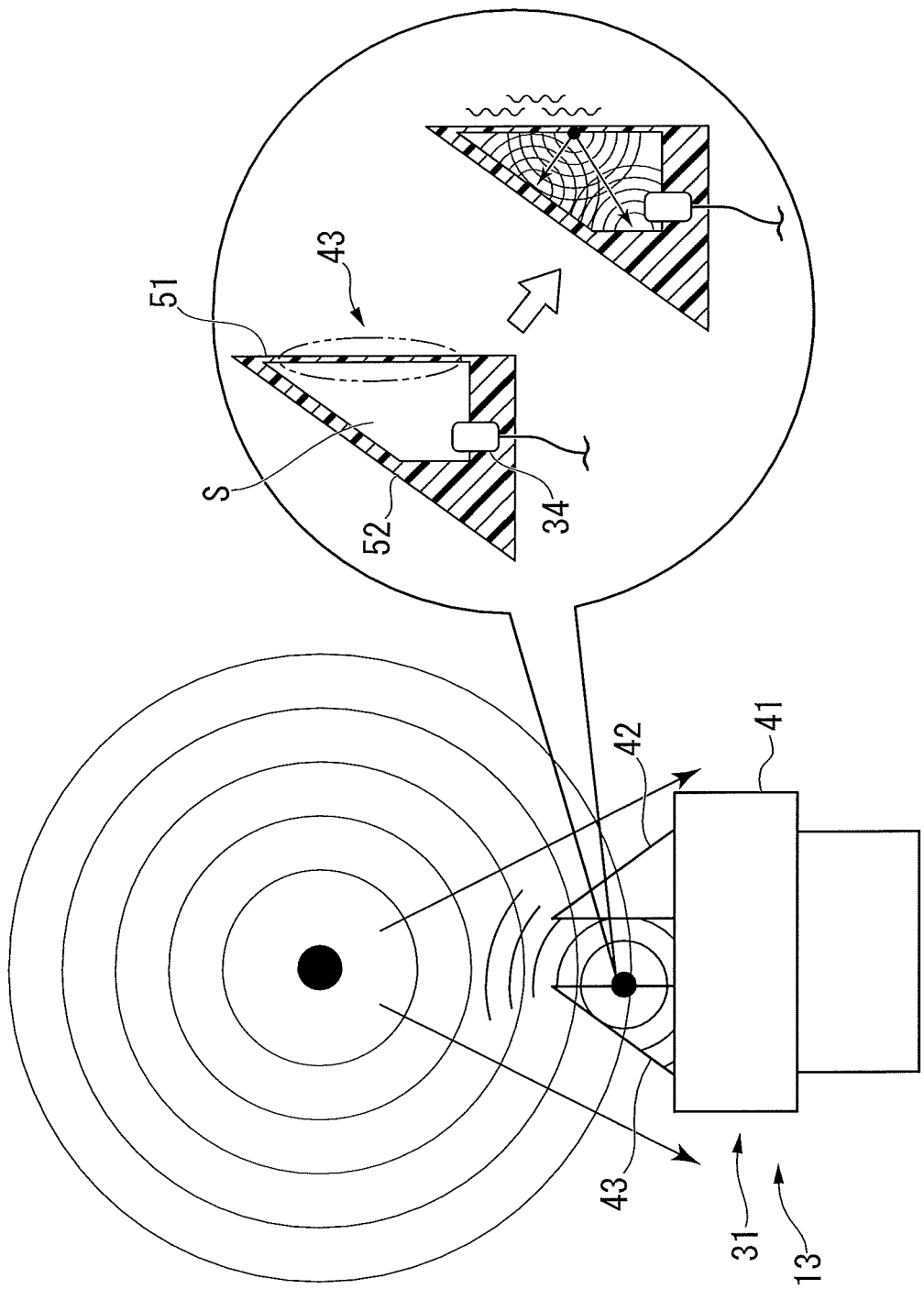
FIG. 4 is a diagram showing an operation of an internal sensor according to the first embodiment.

FIG. 4 is a diagram showing the operation of the internal sensor 34. As illustrated in FIG. 4, when an object P deviates from the first member 42, a vibration is caused on the first face 51 of the first member 42 in accordance with a contact between the object P and the first member 42 via the first wall 71. This vibration is transferred to the gas (hereinafter, referred to "air") inside the internal space S of the first member 42. The vibration transferred to the air inside the internal space S is reflected on a plurality of faces (for example, the first to fourth inner faces 61, 62, 63, and 64) surrounding the internal space S and is amplified inside the internal space S to form a standing wave. In this way, the internal sensor 34 detects vibration of the air using the standing wave formed inside the internal space S. In this embodiment, a vibration caused in a case in which an object P deviates from the first member 42 will be referred to as "a vibration of a first type."

In addition, in a case in which a force acting on the object P from the first member 42 is excessively strong, deformation leading to damage in at least one of the object P and the first member 42 may occur. In a case in which such deformation occurs in the object P or the first member 42, a vibration is caused on the first face 51 of the first member 42 in accordance with the deformation. This vibration, similar to the case in which the object P deviates from the first member 42, is transferred to the air inside the internal space S of the first member 42 via the first wall 71 and is amplified inside the internal space S to form a standing wave. This standing wave is detected by the internal sensor 34. In this embodiment, a vibration caused in a case in which deformation leading to damage in at least one of the object P and the first member 42 occurs will be referred to as "a vibration of a second type." The vibration of the first type and the vibration of the second type have different characteristics (for example, vibration frequencies and peak values of vibrations) and thus can be distinguished from each other. In addition, "deformation" described here is not limited to damage (for example, a crack or a defect) in the object P that is clear in the outer appearance but includes temporary deformation or distortion of the inside of the object P that is not clear in the outer appearance.

The internal sensor 34, in addition to a vibration of a case in which an object P deviates from the first member 42 and a vibration of a case in which deformation occurs at least one of the object P and the first member 42, can detect a vibration caused at the time of a contact made when the first member 42 starts holding the object P.

In this embodiment, since the internal sensor 34 is disposed inside the first member 42, it is difficult for the internal sensor 34 to collect an external sound (for example, noise). In other words, the internal sensor 34 can detect only a specific vibration such as a vibration of a case in which the object P deviates from the first member 42 or a vibration of a case in which deformation occurs in at least one of the object P and the first member 42, or the like.

Figure 5:
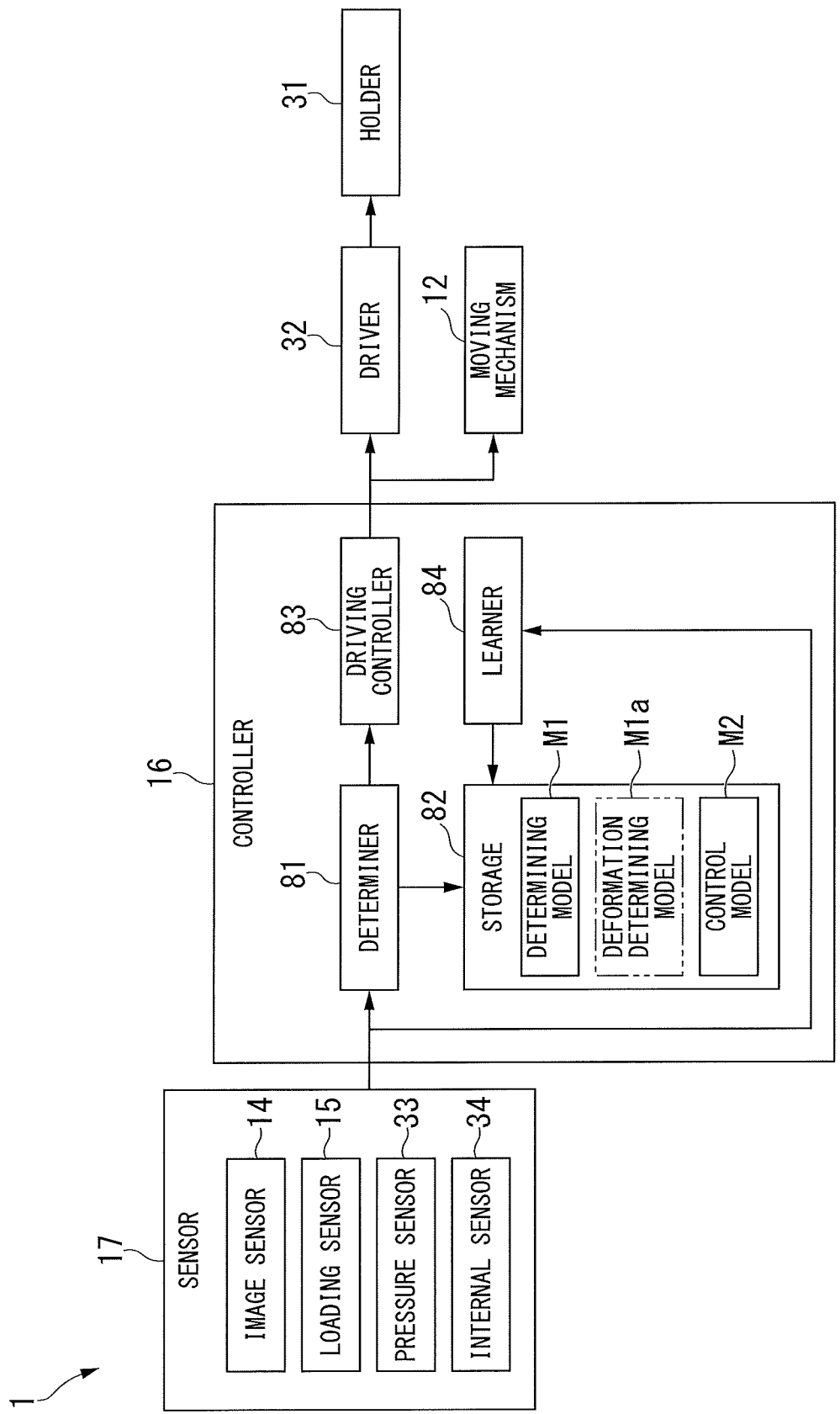
FIG. 5 is a block diagram showing a system configuration of the handling apparatus according to the first embodiment.

Next, the controller 16 will be described. FIG. 5 is a block diagram showing the system configuration of the handling apparatus 1. Hereinafter, the image sensor 14, the loading sensor 15, the pressure sensor 33, and the internal sensor 34 may be collectively referred to as a "sensor group 17." Detection results (for example, output signals) of the sensors 14, 15, 33, and 34 included in the sensor group 17 are output to the controller 16.

As illustrated in FIG. 5, the controller 16, for example, includes a determiner 81, a storage 82, a driving controller 83, and a learner 84.

The determiner 81, for example, determines the holding state of the holder 31 for the object P on the basis of a detection result acquired by the internal sensor 34 and the determining model M1 stored in the storage 82. The holding state, for example, includes: (a) whether or not a deviation of the object P from the holder 31 occurs; and (b) whether or not deformation leading to damage in at least one of the object P and the holder 31 occurs. For example, in a case in which a vibration of the first type is detected by the internal sensor 34, the determiner 81 determines that a deviation of the object P from the holder 31 has occurred. On the other hand, in a case in which a vibration of the second type is detected by the internal sensor 34, the determiner 81 determines that deformation leading to damage has occurred in at least one of the object P and the holder 31.

The determining model M1 is an information processing model that outputs the holding state of the holder 31 for the object P in a case in which a detection result acquired by the internal sensor 34 is input. The determining model M1, for example, is realized by a neural network and includes an input layer, a hidden layer, and an output layer. The hidden layer has a plurality of internal parameters. These internal parameters are used as weighting factors for a plurality of elements input to the input layer. These internal parameters are acquired through machine learning using the learner 84 to be described later. Such a determining model M1, for example, may be derived by causing weighting coefficients of an error function to converge by using an error inverse propagation method or the like or may be derived by generating a model using a restricted Boltzmann machine or the like and performing fine tuning of the generated model.

The driving controller 83 controls the driver 32 and the moving mechanism 12 on the basis of a determining result acquired by the determiner 81 and a control model M2 stored in the storage 82. In this embodiment, in a case in which a vibration is caused in the first member 42 or the second member 43, the driving controller 83 changes the control of the moving mechanism 12 and the driver 32 on the basis of a determining result acquired by the determiner 81 based on a detection result acquired by the internal sensor 34.

For example, in a case in which it is determined that a deviation of the object P from the first member 42 has occurred (in other words, in a case in which a vibration of the first type is detected by the internal sensor 34), the driving controller 83 performs controls of the driver 32 to increase the holding force of the holder 31 holding the object P. More specifically, the driving controller 83 performs control of the driver 32 to decrease the distance between the first member 42 and the second member 43. Accordingly, the holding force for the object P is increased. The degree of increase in the holding force is determined on the basis of the control model M2. In other words, the degree of increase in the holding force is learned in advance through machine learning to be described later for each characteristic of the vibration detected by the internal sensor 34 (in other words, for each type of object or state of the object P).

On the other hand, in a case in which it is determined that deformation leading to damage has occurred in at least one of the object P and the holder 31 (in other words, in a case in which a vibration of the second type is detected by the internal sensor 34), the driving controller 83 performs control of the driver 32 to decrease the holding force of the holder 31 holding the object P. More specifically, the driving controller 83 performs control of the driver 32 to increase the distance between the first member 42 and the second member 43. Accordingly, the holding force for the object P is decreased. The degree of decrease in the holding force is determined on the basis of the control model M2. In other words, the degree of decrease in the holding force is learned in advance through the machine learning to be described later for each characteristic of the vibration detected by the internal sensor 34 (in other words, for each type of object or state of the object P).

In addition, in a case in which it is determined that a deviation of the object P from the holder 31 has occurred or in a case in which deformation leading to damage in at least one of the object P and the holder 31 has occurred, the driving controller 83 may stop the moving of the holding device 13 using the moving mechanism 12 or perform another predetermined operation. The operation of the moving mechanism 12 is determined on the basis of the control model M2. In other words, optimal moving of the moving mechanism 12 according to each situation is learned in advance through the machine learning to be described later.

The control model M2 is a control model in comprehensive consideration of detection results acquired by the image sensor 14, the loading sensor 15, and the pressure sensor 33 in addition to the detection result acquired by the internal sensor 34. This control model M2, similar to the determining model M1, is realized by a neural network. For example, a detection result acquired by the internal sensor 34, a detection result acquired by the image sensor 14, a detection result acquired by the loading sensor 15, a detection result acquired by the pressure sensor 33, and the like are input to the input layer of the control model M2. Then, optimal operation contents of the driver 32 and the moving mechanism 12 according to each situation are output to the output layer of the control model M2. The driving controller 83 controls the driver 32 and the moving mechanism 12 on the basis of the operation contents output from the control model M2. Here, while the determining model M1 and the control model M2 are separately described, the determining model M1 may be part of the control model M2.

The learner 84 learns the determining model M1 and the control model M2 through machine learning on the basis of learning data and correct answer data. The learning data, for example, is test data of M dimensions (here, M is an arbitrary natural number). The test data of the M dimensions includes output results of the sensor group 17 (for example, time-series data of the sensor group 17) in M tests (for example, tests relating to the holding of an object P). The output results of the sensor group 17 in each time includes information of N dimensions (here, N is an arbitrary natural number). The information of the N dimensions is N pieces of information including the detection result acquired by the internal sensor 34, the detection result acquired by the image sensor 14, the detection result of the loading sensor 15, the detection result acquired by the pressure sensor 33, and the like. In this embodiment, test data of such M×N dimensions is input to the learner 84 as learning data.

Further, the correct answer data represents a correct answer of the holding state of the holder 31 in each of the M tests. The correct answer data includes at least one of (i) occurrence of a deviation of the object P from the holder 31, (ii) occurrence of deformation leading to damage in at least one of the object P and the holder 31, and (iii) normality (for example, there is no failure) as the holding state of the holder 31. Such correct answer data, for example, is manually prepared and is input to the learner 84. Accordingly, the learner 84 optimizes the internal parameters of the hidden layer of the determining model M1 on the basis of the learning data and the correct answer data.

In addition, the controller 16 may include a deformation determining model M1a used for determining deformation leading to damage in at least one of the object P and the holder 31 as part of the determining model M1. For example, the deformation determining model M1a, similar to the determining model M1, is realized by a neural network. In a case in which such a deformation determining model M1a is included, the controller 16 determines the deformation of at least one of the object P and the holder 31 on the basis of the detection result output from the internal sensor 34 and the deformation determining model M1a. In addition, a sample object for training may be prepared, and, by using the determining model M1a, in a case in which deformation leading to damage is detected, instead of decreasing the gripping force, by rather increasing the gripping force to destruct the sample object, an experience of destruction may be automatically learned. By configuring as such, a deformed model of an unregistered object can be newly generated autonomously without causing a person to register correct answer information each time.

Figure 6:
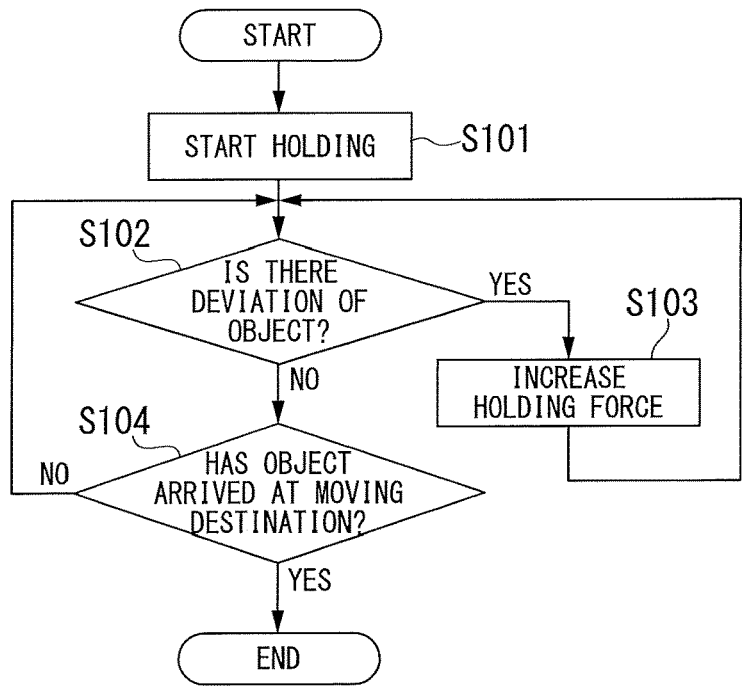
FIG. 6 is a flowchart showing one example of a flow of a control operation of a controller according to the first embodiment.

Next, the flow of the control operation of the controller 16 will be described. FIG. 6 is a flowchart showing one example of the flow of the control operation of the controller 16. FIG. 6 shows a case in which only a deviation of the object P from the first member 42 is considered.

As illustrated in FIG. 6, first, the holder 31 starts holding an object P (S101). The internal sensor 34 detects the presence/absence of a vibration transferred to the inside of the first member 42 or the second member 43 at a predetermined sampling period in a state in which the object P is lifted up by the holder 31 (for example, including both a state in which the object P is only lifted up and a state in which the lifted object P is moved toward a moving destination). Then, the determiner 81 determines whether or not a deviation of the object P from the holder 31 has occurred on the basis of the detection result D output from the internal sensor 34 (S102).

In a case in which it is determined that a deviation of the object P from the holder 31 has occurred (S102: Yes), the determiner 81 outputs a signal representing the presence of the deviation of the object P to the driving controller 83. In a case in which the signal representing the presence of a deviation of the object P is received, the driving controller 83 performs control of the driver 32 to increase the holding force of the holder 31 holding the object P (S103).

Then, the determiner 81 determines the holding state of the holder 31 again in a state in which the holding force for the object P is increased. In other words, the determiner 81 determines whether or not a deviation of the object P from the first member 42 is still occurring on the basis of the detection result D output from the internal sensor 34 in a state in which the holding force for the object P is increased. The determiner 81 increases the holding force until a deviation of the object P disappears by repeating the processes of S102 and S103.

Next, the determiner 81 determines whether or not the object P has arrived at the moving destination (for example, the second area T2) on the basis of the output result of the loading sensor 15 and the like (S104). In a case in which the object P has not arrived at the moving destination, the determiner 81 repeats the determination of S104 at a predetermined sampling period. On the other hand, in a case in which the object P has arrived at the moving destination, the process of this flow ends.

Figure 7:
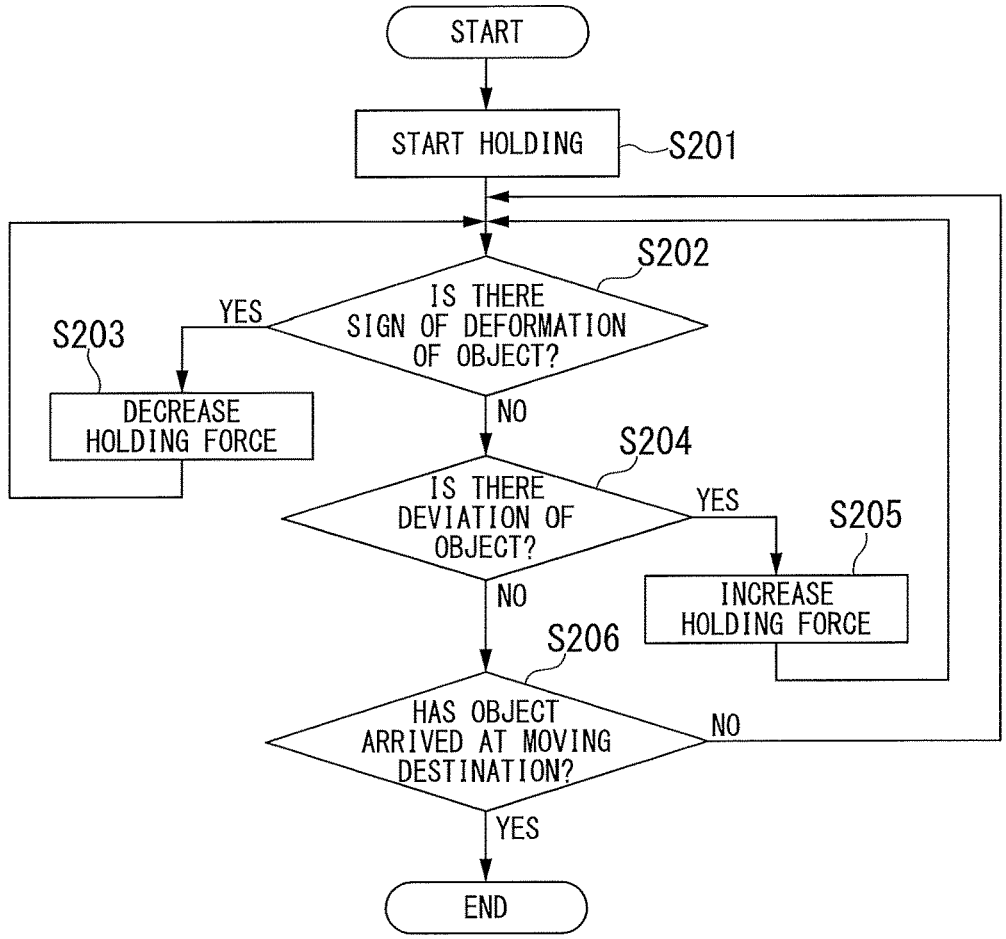
FIG. 7 is a flowchart showing another example of a flow of a control operation of the controller according to the first embodiment.

FIG. 7 is a flowchart showing another example of the flow of the control operation of the controller 16. FIG. 7 shows a case in which deformation of at least one of the object P and the holder 31 is also considered in addition to a deviation of the object P from the holder 31.

As illustrated in FIG. 7, first, the holder 31 starts holding an object P (S201). The internal sensor 34 detects the presence/absence of a vibration transferred to the inside of the first member 42 or the second member 43 at a predetermined sampling period in a state in which the object P is lifted up by the holder 31 (for example, including both a state in which the object P is only lifted up and a state in which the lifted object P is moved toward a moving destination). Then, the determiner 81 determines whether or not deformation leading to damage in at least one of the object P and the holder 31 has occurred on the basis of the detection result D output from the internal sensor 34 (S202).

In a case in which it is determined that deformation leading to damage in at least one of the object P and the holder 31 has occurred (S202: Yes), the determiner 81 outputs a signal representing the presence of deformation to the driving controller 83. In a case in which the signal representing the presence of deformation is received, the driving controller 83 performs control of the driver 32 to decrease the holding force of the holder 31 holding the object P (S203).

Then, the determiner 81 determines the holding state of the holder 31 again in a state in which the holding force for the object P is decreased. In other words, the determiner 81 determines whether or not the deformation leading to damage in at least one of the object P and the holder 31 is still occurring on the basis of the detection result D output from the internal sensor 34 in a state in which the holding force for the object P is decreased. The determiner 81 decreases the holding force until the deformation leading to damage in at least one of the object P and the holder 31 disappears by repeating the processes of S202 and S203.

On the other hand, in a case in which it is determined that deformation leading to damage in at least one of the object P and the holder 31 has not occurred (S202: No), the determiner 81 determines whether or not a deviation of the object P from the holder 31 has occurred on the basis of the detection result D output from the internal sensor 34 (S204).

In a case in which it is determined that a deviation of the object P from the holder 31 has occurred (S204: Yes), the determiner 81 outputs a signal representing the presence of a deviation of the object P to the driving controller 83. In a case in which the signal representing the presence of a deviation of the object P is received, the driving controller 83 performs control of the driver 32 to increase the holding force of the holder 31 holding the object P (S205). Here, the width of increase in the holding force may be smaller than the width of decrease of the holding force in the process of S203.

Then, the determiner 81 determines the holding state of the holder 31 again in a state in which the holding force for the object P is increased. In other words, the determiner 81 determines whether or not a deviation of the object P from the holder 31 is occurring on the basis of the detection result D output from the internal sensor 34 in a state in which the holding force for the object P is increased. The determiner 81 increases the holding force until a deviation of the object P disappears by repeating the processes of S204 and S205.

Next, the determiner 81 determines whether or not the object P has arrived at the moving destination (for example, the second area T2) on the basis of the output result of the loading sensor 15 and the like (S206). In a case in which the object P has not arrived at the moving destination, the determiner 81 repeats the judgments of S202 and S204 at a predetermined sampling period. On the other hand, in a case in which the object P has arrived at the moving destination, the process of this flow ends.

Figure 8:
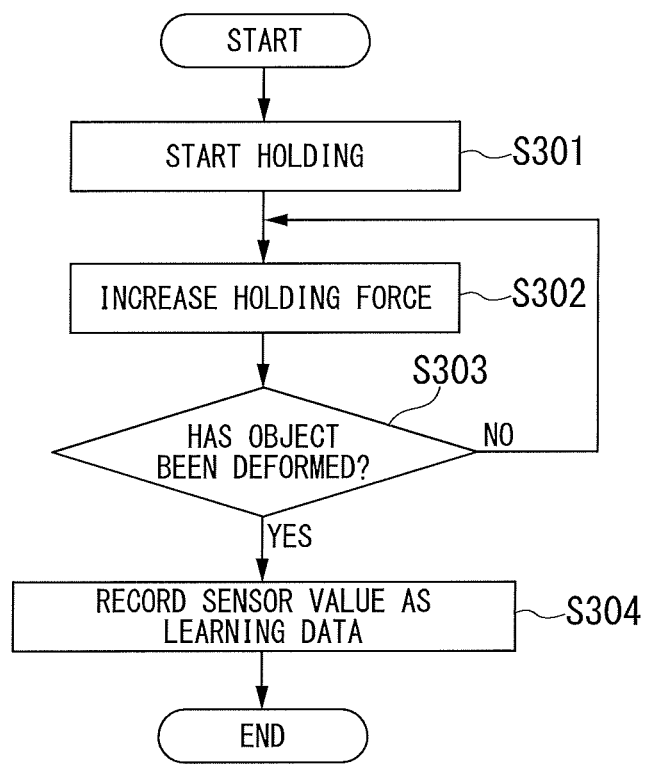
FIG. 8 is a flowchart showing one example of a flow of learning a determining model according to the first embodiment.

Next, the flow of the learning of the deformation determining model M1a using the learner 84 through machine learning will be described. FIG. 8 is a flowchart showing one example of the flow of learning of the deformation determining model M1a using the learner 84. As illustrated in FIG. 8, first, the holder 31 starts holding an object P (S301). Next, the driving controller 83 performs control of the driver 32 to increase a force (i.e., holding force) applied to the object P (S302). Next, it is determined whether or not deformation leading to damage has occurred in the object P in accordance with the increase in the holding force (S303). This determination may be performed through person's visual observation or the like or may be automatically performed through image processing using the image sensor 14. In a case in which deformation leading to damage in the object P has not been observed (S303: No), the driving controller 83 performs control of the driver 32 to further increase the holding force (S302). On the other hand, in a case in which deformation leading to damage in the object P has been observed (S303: Yes), a measured value acquired by the internal sensor 34 at this time is stored in the storage 82 as learning data (S304). In other words, a vibration pattern detected by the internal sensor 34 when the deformation of the object P occurs is recorded as information of a vibration relating to the deformation of the object P. Then, the learner 84 learns internal parameters of the deformation determining model M1a on the basis of the vibration pattern (i.e., learning data) stored in the storage 82 and the correct answer data, for example, prepared manually.

In the flowchart described above, while the machine learning relating to the deformation of the object P has been described, machine learning may be performed in this way also for a deviation of the object P from the holder 31. In other words, after the holder holds the object P, the driving controller 83 performs control of the driver 32 to decrease the holding force. Next, it is determined whether or not the object P deviated from the holder 31 in accordance with a decrease in the holding force through visual observation, image processing, or the like. In a case in which a deviation of the object P has not been observed, the driving controller 83 performs control of the driver 32 to further decrease the holding force. At a time point at which the deviation of the object P has been observed, a measured value acquired by the internal sensor 34 at this time is recorded as learning data of information of a vibration relating to the deviation of the object P. By using such machine learning, a determining model used for determining a deviation of the object P from the holder 31 may be learned.

Figure 9:
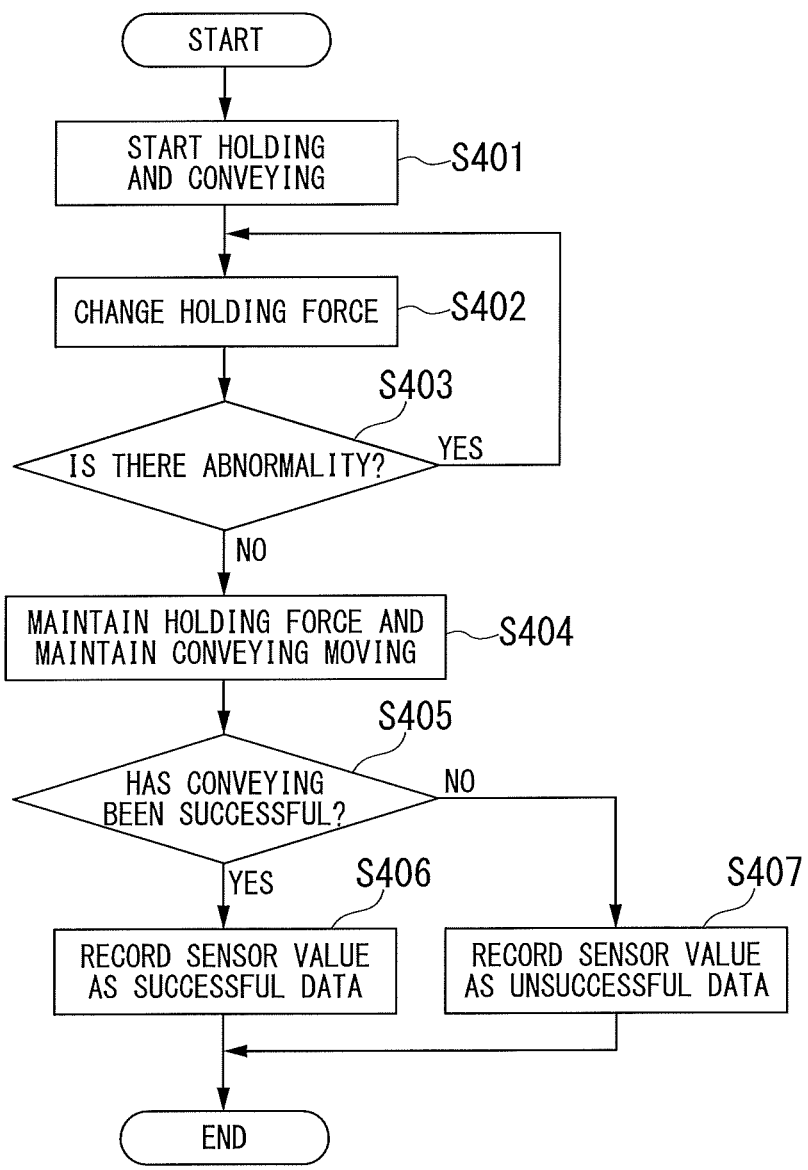
FIG. 9 is a flowchart showing one example of a flow of learning a control model according to the first embodiment.

Next, the flow of learning of the control model M2 through machine learning by using the learner 84 will be described. FIG. 9 is a flowchart showing one example of the flow of learning the control model M2 by using the learner 84. As illustrated in FIG. 9, first, the holder 31 holds an object P and starts conveyance thereof (S401). Next, the driving controller 83 changes the control of the driver 32, whereby the holding force is changed (S402). The influence of this change in the holding force is monitored by each sensor. For example, the internal sensor 34 monitors the appearance of the vibration in the first face 51 of the first member 42 or the second member 43, the image sensor 14 monitors the position of the object P, the presence/absence of deformation thereof, and the like, and the pressure sensor 33 monitors the holding force of the object P. In this way, each sensor monitors the presence/absence of an abnormal change relating to the object P. Then, in a case in which the abnormal change is present (S403: Yes), the holding force is changed in accordance with the type of abnormal change (S402). For example, in a case in which a deviation of the object P has been detected, the driving controller 83 performs control of the driver 32 to increase the holding force. On the other hand, in a case in which deformation leading to damage in the object P has been detected, the driving controller 83 performs control of the driver 32 to decrease the holding force. The cycle described above is continued until the abnormal change is resolved, and, in a case in which it is determined that an abnormal change is absent (S403: No), the holding force is maintained, and the conveyance is continued (S404).

Thereafter, it is determined whether or not the conveyance is successful on the basis of information supplied from the image sensor 14, the loading sensor 15, and the like (S405). In a case in which it is determined that the conveyance is successful (S405: Yes), a sensor value of each sensor is recorded as successful data (S406). On the other hand, in a case in which it is determined that the conveyance is unsuccessful (S405: No), a sensor value of each sensor is recorded as unsuccessful data (S407). In this way, by causing the handling apparatus 1 to learn the flow from the start of conveyance to the completion of the conveyance by using each sensor, the handling apparatus 1 can learn different holding and conveying methods for various objects P (for example, a hard object, a soft object, a heavy object, a light object, and the like). In this way, a handling task without any useless operation can be performed.

In this embodiment, since objects P of various kinds may be considered as holding targets, the handling apparatus 1 uses not external information (for example, information of the object P that is a holding target) but internal information (in other words, information of a vibration of the surface of the holder 31). In other words, the machine learning of the learner 84 is learning based on the information of the vibration of the holding device 13 and is learning in a "closed system."

The machine learning described above can be performed using an object P that is for learning before the handling apparatus 1 is actually used. For example, by performing the machine learning for objects P of various materials, when an object P is initially held, the hardness, the softness, the robustness, the fragility, and the like of the object P can be automatically determined, and a holding force according to the characteristic of the object P can be generated. In addition, a timing at which the machine learning is performed is not limited to the example described above. For example, after the handling apparatus 1 is installed, the machine learning described above may be performed in a field by using an object P that is an actual conveyance target.

Figure 10:
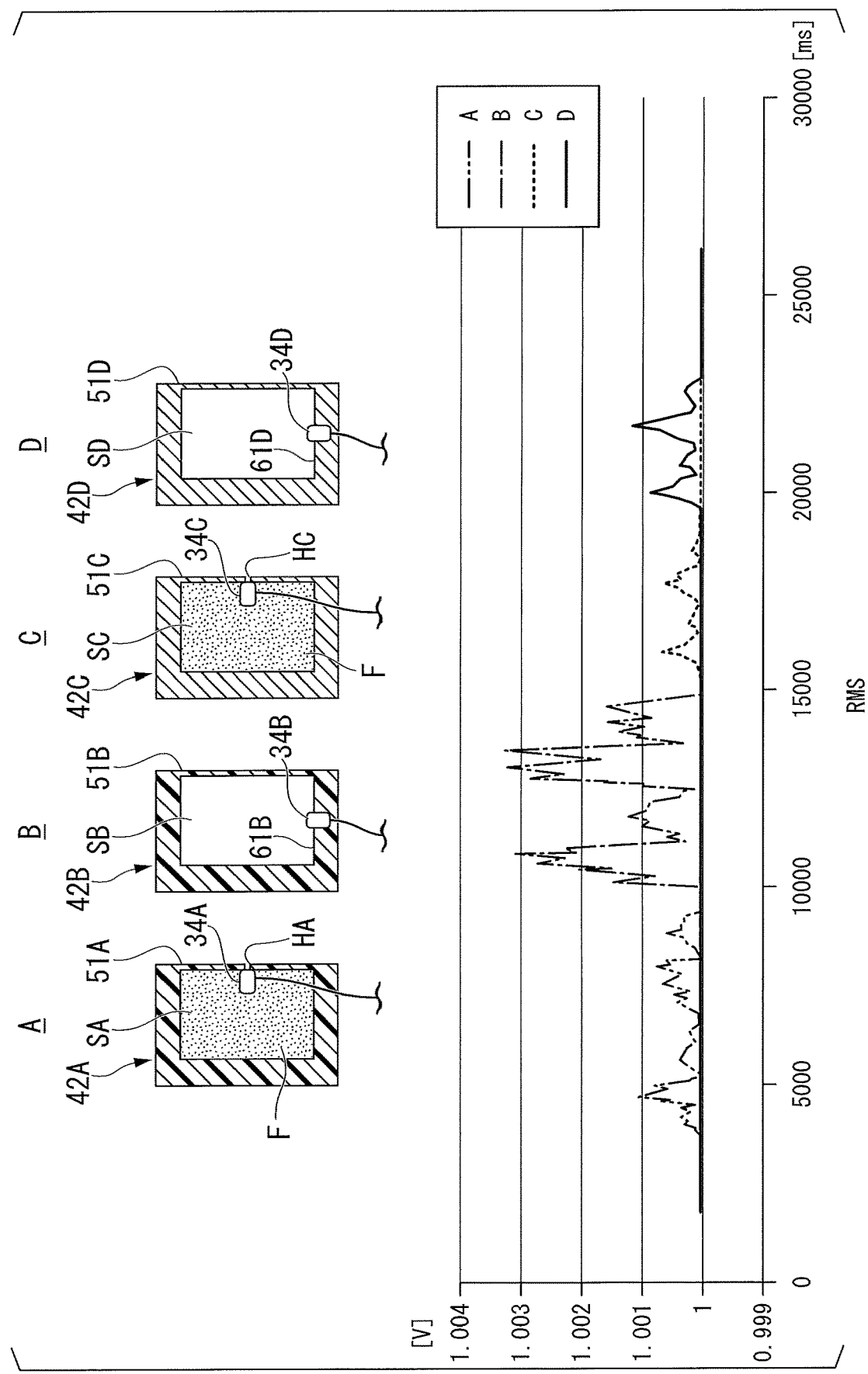
FIG. 10 is a diagram showing preliminary experiments for the holding device according to the first embodiment.

Next, the operation of the holding device 13 according to this embodiment will be described with reference to FIG. 10. FIG. 10 shows schematic views (on the upper side in FIG. 10) of preliminary experiments performed by the inventors and others and results thereof (on the lower side in FIG. 10). In these preliminary experiments, two boxes 42A and 42B formed of resins and two boxes 42C and 42D formed of aluminum imitating the first member 42 were prepared. In such boxes 42A, 42B, 42C, and 42D, internal spaces SA, SB, SC, and SD are respectively formed. In the box 42A formed of a resin, and the box 42C formed of aluminum, the internal spaces SA and SC are filled with sponges F absorbing sounds. On the first faces 51A and 51C of the boxes 42A and 42C, holes HA and HC are respectively formed. On the right inner sides of the holes HA and HC, microphones 34A and 34C are respectively arranged. On the other hand, the internal spaces SB and SD of the box 42B formed of the resin and the box 42D formed of aluminum are filled with the air. Microphones 34B and 34D are respectively attached to the internal spaces SB and SD. The microphones 34B and 34D are respectively attached to the inner faces 61B and 61D of the boxes 42B and 42D so as to be exposed to the internal spaces SB and SD.

The first faces 51A, 51B, 51C, and 51D of the boxes 42A, 42B, 42C, and 42D were sequentially scraped by a test object (for example, a brush) two times each, and voltage waveforms measured by the microphones 34A, 34B, 34C, and 34D disposed inside the boxes 42A, 42B, 42C, 42D at this time were recorded. The measurement results are illustrated on the lower side in FIG. 9. The horizontal axis represents the time (ms), and the vertical axis represents the root means square (RMS) of the measured voltage (V).

According to this, although scraping was detected in any one of the microphones 34A, 34B, 34C, and 34D, the scraping was detected the most markedly in the box 42B. When comparing the boxes 42A and 42C filled with the sponges F with the boxes 42B and 42D filled with the air, the signal of the box 42B is larger than the signal of the box 42A, and the signal of the box 42D is larger than the signal of the box 42C. In other words, it can be understood that the intensity of a detected signal is larger in a case in which vibrations of the scraping are detected using microphones disposed separately from scraped faces in the internal spaces SB and SD filled with the air than in a case in which vibrations of the scraping are detected through holes using the microphones disposed on the right inner sides of the scraped faces. The reason for this is considered that, in the boxes 42B and 42D filled with the air, the vibrations of the scraped faces were transferred to the air inside the internal spaces SB and SD of the boxes 42B and 42D, and amplified standing waves were formed in accordance with reflection on the inner faces of the internal spaces SB and SD.

When the boxes 42A and 42B formed of the resin are compared with the boxes 42C and 42D formed of aluminum, the signal of the box 42A was larger than the signal of the box 42C, and the signal of the box 42B was larger than the signal of the box 42D. In other words, it has been disclosed that the intensities of signals detected by the boxes 42A and 42B formed of the resin are stronger than those detected by the boxes 42C and 42D formed of aluminum.

In this way, by disposing vibration sensors (for example, microphones) 34A, 34B, 34C, and 34D inside the boxes 42A, 42B, 42C, and 42D, the scraping on the surfaces of the boxes 42A, 42B, 42C, and 42D can be detected. Since the microphones 34A, 34B, 34C, and 34D are respectively arranged inside the boxes 42A, 42B, 42C, and 42D, the influence of external sounds can be suppressed more than in a case in which microphones are disposed outside the boxes 42A, 42B, 42C, and 42D. In this way, small vibrations of the surfaces of the boxes 42A, 42B, 42C, and 42D can be detected.

According to such a configuration, the holding device 13 can achieve improvement in the object holding ability. In other words, in this embodiment, the holding device 13 includes: the first holder 31 that includes the first member 42 and the second member 43 and holds an object P by interposing the object P between the first member 42 and the second member 43; and the first sensor 34 that is disposed inside the first member 42 and detects a vibration. According to such a configuration, a fine deviation between the holder 31 and the object P can be detected on the basis of a detection result acquired by the internal sensor 34. By arranging the first sensor 34 inside the first member 42, a direct change of the held object P can be identified. In addition, since external noises are small, necessary information can be clearly detected. For this reason, a contact state between the holder 31 and the object P can be acquired in a simple manner.

In order to grip various objects P having different shapes and different levels of hardness and continuously handing the objects without causing them to fall, there are cases in which it is effective to detect scraping between the holder 31 and the object P. However, in an handling apparatus of a comparative example performing control using a pressure sensor or a camera, it is difficult to detect scraping or slipping between the holder 31 and the object P using the pressure sensor or the camera. In addition, due to differences in the physical properties of objects P, it is difficult to perform stable gripping using only information recognized by the camera. For this reason, in order to detect a small vibration, there are cases in which a handling apparatus of a comparative example, for example, uses a microphone or an acceleration sensor. However, a sensor attached to a device that is in the middle of operation frequently collects various noise vibrations. There are cases in which it is difficult for a computer to analyze a noise vibration that can be understood by a person as being a noise through their experiences as noise. In addition, in a case in which a microphone is attached to the outside of the holder, it is difficult to distinguish an external noise from a sound due to a target operation. Furthermore, it is difficult to use a contact sensor or the like due to its complexity, high price, and narrow detection range.

In contrast to this, according to the configuration described above, the holding device 13 does not need a high-priced and complex sensor such as a tactile sensor. In the holding device 13, since the internal sensor 34 is built inside the holder 31, a signal realizing stable holding can be acquired using a simple mechanism and inexpensive sensor. Accordingly, fine scraping and a fine contact that are conventionally difficult to detect can be reliably detected by employing a combination of the simple and low-priced sensor and the structure, and accordingly, it is easy for a user to introduce the holding device. In addition, in a case in which the internal sensor 34 is disposed inside the first member 42, compared to a holding device in which a sensor detecting a vibration is exposed outside, there is no large influence from external sounds, and a vibration caused between the holder 31 and a held object P can be clearly detected in real time.

Furthermore, the internal sensor 34 is shipped with being built inside the holding device 13. For this reason, differently from a case in which a sensor is attached or arranged outside the holder that is not a sensor-actuator integration type, basically, the holder 31 and the internal sensor 34 are not separately replaced. Accordingly, calibration operations such as zero-point matching and background noise measurement can be performed in units of modules at the time of assembling modules, and calibration after installation is unnecessary. For this reason, a setting process in a factory field can be suppressed to be minimal, and there is an advantage for full automation of a factory and the like.

In this embodiment, the first member 42 has such a rigidity that a vibration caused on the surface of the first member 42 is transferred to the inside. In order to perform safe and reliable handling, it is necessary to detect a slight deviation between relative positions of the holder and the object P in real time for predicting the fall of the object P. However, as described above, it is difficult for a pressure sensor or a camera to detect small scrapping or slipping between the holder and the object P. For this reason, tactile sensors having a special structure or sensor arrangement in which small sensors are uniformly attached to the surface of the holder and the like have been researched. However, durability is required for a handling apparatus that is produced for the purpose of repeatedly holding various objects P. Thus, for the protection of a tip end of the holder and sensors attached to the tip end, prevention of a slippage, following a change in the shape of an object P, or the like, generally, the face of the holder that is brought into contact with the object P is covered with a soft material such as rubber or silicon. However, there are cases in which such a material deteriorates and is damaged after a long time use. In addition, since there are cases in which a signal caused by a slight contact with the holder, a deviation therefrom, or the like is absorbed by a soft material to cause information to partly disappear, there is a limit on delicate control. In addition, it is difficult to attach sensors and assemble the holder, which is not appropriate for mass production. In contrast to this, according to the configuration described above, fine scraping or slipping can be detected using a simple and robust configuration without using soft silicon rubber or the like.

According to this embodiment, the first sensor 34 detects a vibration caused inside the first member 42 due to a vibration caused on the surface of the first member 42. According to such a configuration, the first sensor 34 can detect a fine vibration of the surface that is difficult to detect using an existing sensor. In addition, the first sensor 34 detects a vibration inside the first member 42, and accordingly, the influence of external noises can be reduced.

In this embodiment, the first member 42 is formed of at least one of a hard synthetic resin, metal, and wood. According to such a configuration, since the first member 42 is formed using a material in which a sound can easily echo, fine scraping or slipping can propagate well into the inside of the first member 42. For this reason, a vibration of the surface of the first member 42 can be detected with higher sensitivity.

In this embodiment, the first member 42 has the internal space S, at least part of the first sensor 34 is arranged in the internal space S, and the first sensor 34 detects a vibration caused inside the internal space S. According to such a configuration, a standing wave that is instantly amplified in the internal space S is detected by the internal sensor 34, and accordingly, the holding device 13 can detect a vibration between the holder 31 and the object P with high sensitivity. In addition, since it is difficult for external noises to enter into the internal space S, a vibration due to a direct contact between the holder 31 and the object P can be clearly detected.

In this embodiment, the internal space S is filled with the gas, and the first sensor 34 detects a vibration of the gas disposed inside the internal space S. According to such a configuration, since the internal gas transfers the vibration, an inexpensive microphone can be used. In this way, a simple and inexpensive configuration can be realized.

In this embodiment, the internal space S is sealed. According to such a configuration, since the entering of external sounds into the inside of the internal space S can be further disturbed, and accordingly, a vibration can be detected with higher sensitivity.

In this embodiment, the first member 42 includes the first face 51 facing an object P and the second face 52 different from the first face, and the first thickness d1 between the first face 51 and the internal space S is smaller than the second thickness d2 between the second face 52 and the internal space S. According to such a configuration, since the first face 51 brought into contact with the object P is thin, a vibration between the first face 51 and the object P can be easily transferred into the internal space S. For this reason, a standing wave can be easily formed inside the internal space S, and a vibration can be easily detected by the internal sensor 34.

In this embodiment, the first member 42 includes the first face 51 facing an object P, and the internal space S includes the first inner face 61 that is substantially parallel with the first face 51, the second inner face 62 that is positioned on a side opposite to the first inner face 61 inside the internal space S, and the third inner face 63 that is different from the first inner face 61 and the second inner face 62, and the first sensor 34 is attached to the third inner face 63. According to such a configuration, in a case in which the third inner face 63 is located on the main body 41 side, a wired connection of the first sensor 34 to the inside of the main body 41 can be easily made. For this reason, a simpler and inexpensive configuration can be realized.

In this embodiment, the first member 42 includes the first face 51 facing an object P, and the first face 51 has surface roughness higher than that of at least part of the first holder 31. According to such a configuration, a vibration can be easily caused between the first face 51 and the object P, and accordingly, the detection sensitivity of a vibration using the internal sensor 34 can be improved.

In this embodiment, the handling apparatus 1 includes: the holding device 13 including the first holder 31 that has the first member 42 and the second member 43 and holds an object P by interposing the object P between the first member 42 and the second member 43, the first sensor 34 that is disposed inside the first member 42 and detects a vibration, and the driver 32 that drives at least one of the first member 42 and the second member 43; and the controller 16 that changes the control of the driver 32 on the basis of a detection result output from the first sensor 34 in a case in which a vibration is caused on the first member 42. According to such a configuration, by detecting a contact at the time of starting holding when a soft object P is held, a deviation in the middle of holding the object P, deformation of the object P, and the like using the internal sensor 34, the holding force can be appropriately adjusted on the basis of such information. Accordingly, since the holding force can be optimized, a possibility that falling, deformation, damage, and the like of the object P occur can be decreased.

In this embodiment, the controller 16 performs control of the driver 32 to increase the holding force of the first holder 31 holding the object P in a case in which a vibration of the first type is detected by the first sensor 34 and performs control of the driver 32 to decrease the holding force of the holder 31 holding the object P in a case in which a vibration of the second type different from the vibration of the first type is detected by the first sensor 34. The vibration of the first type is a vibration caused in a case in which the object P deviates from the first member 42, and the vibration of the second type is a vibration caused in a case in which deformation leading to damage occurs in at least one of the object P and the first member 42. According to such a configuration, by increasing the holding force for a deviation of the object P, the possibility of dropping of the object P is decreased. On the other hand, by decreasing the holding force for the deformation of the object P, the possibility that the object P is deformed or damaged can be decreased. In this way, various objects P having different shapes and levels of hardness can be gripped and can be continued to be handled without dropping the objects.

In this embodiment, the controller 16 includes the learner 84 that learns the determining model M1 used for determining the state of the holder 31 for the object P on the basis of a detection result output from the first sensor 34 through machine learning. According to such a configuration, various signals detected by the internal sensor 34 can be associated with actual statuses of the object P. Accordingly, the holding force can be optimized for various objects P (for example, including objects P of which learning data has not been input in advance). In addition, by performing learning for objects P having various properties such as a hard object P, a soft object P, and a fragile object P, and objects from a hard object P to a fragile object P can be automatically held with appropriate holding forces without additionally arranging a dedicated sensor. In addition, the handling apparatus 1 may perform autonomous learning of a method of holding an unknown object P.

In the description presented above, while the controller 16 has been described to control the overall operation of the handling apparatus 1, for example, a controller controlling the holding device 13 may be built in the holding device 13 separately from the overall controller 16.

Second Embodiment

Next, a second embodiment will be described with reference to FIG. 11. In the second embodiment, a plurality of holes 91 having an array pattern are disposed on a first face 51 of a first member 42, and such holes 91 are closed by vibration sensors 92, which is different from the first embodiment. In addition, configurations other than those described in the following description are similar to those of the first embodiment.

Figure 11:
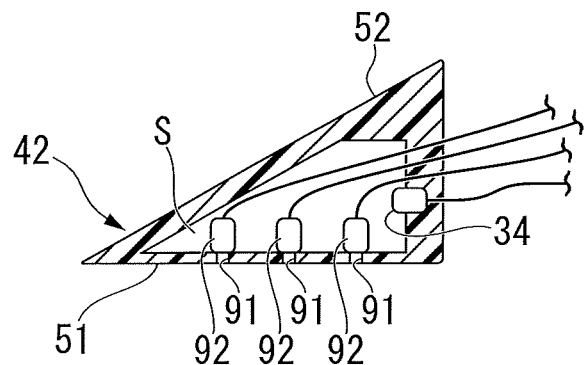
FIG. 11 is a cross-sectional view showing a first member according to a second embodiment.

FIG. 11 is a cross-sectional view showing the first member 42 according to the second embodiment. As illustrated in FIG. 11, the first member 42, similar to that of the first embodiment, includes an internal space S. On the first face 51 of the first member 42, a plurality of holes 91 are arranged in an array pattern. Here, "arranged in an array pattern" means that the plurality of holes 91 are uniformly arranged in each of a first direction and a second direction intersecting the first direction (for example, substantially orthogonal thereto). A holder 31 according to this embodiment includes a plurality of vibration sensors 92 in addition to the internal sensor 34. The plurality of vibration sensors 92 (for example, microphones) are arranged in the internal space S and faces the plurality of holes 91 from the inside of the internal space S to have one-to-one matching. The plurality of holes 91 are closed by the plurality of vibration sensors 92. The vibration sensors 92 may be either sensors of the same kind as that of the internal sensor 34 or sensors of a type different from the kind. The vibration sensors 92 are examples of the "second sensors".

According to such a configuration, vibrations at a plurality of positions on the first face 51 can be detected using the plurality of vibration sensors 92. In other words, in this embodiment, a holding device 13 includes a plurality of second sensors 92 capable of detecting vibrations, and a first member 42 includes a first face 51 that faces an object P and has a plurality of holes 91 open, and the plurality of second sensors 92 are arranged in the internal space S and faces the plurality of holes 91. For this reason, by comparing detection results output from the vibration sensors 92, the handling apparatus 1 can specify a detailed position at which the vibration has occurred on the first face 51. Accordingly, the holding status and the like of the object P can be monitored more accurately. In addition, in a case in which the plurality of vibration sensors 92 are disposed near the first face 51, a fine contact can be detected with high sensitivity. Here, the number and the arrangement of holes 91 are not limited to those of the example described above, and an arbitrary number of holes 91, which is one or more, may be formed on the first face 51 in arbitrary arrangement.

Third Embodiment

Next, a third embodiment will be described with reference to FIG. 12. In the third embodiment, an internal space S is not disposed in a first member 42, and an internal sensor 34 is embedded inside the first member 42, which is different from the first embodiment. In addition, configurations other than those described below are similar to those of the first embodiment.

Figure 12:
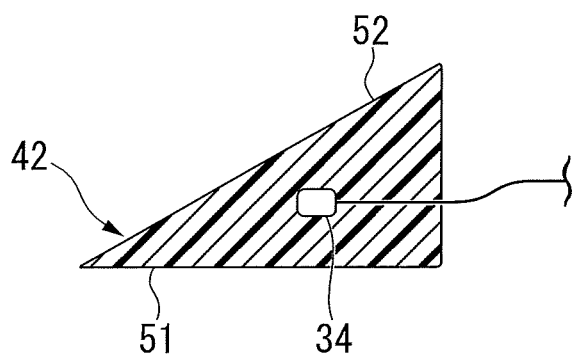
FIG. 12 is a cross-sectional view showing a first member according to a third embodiment.

FIG. 12 is a cross-sectional view showing the first member 42 according to the third embodiment. The first member 42 is a solid member not including an internal space S unlike the first embodiment. The internal sensor 34 is embedded inside the first member 42.

According to such a configuration, the cost for forming the internal space S of the first member 42 can be reduced. The configuration of the holder 31 is not limited to the configuration example. For example, the first member 42 may not solid but includes an internal space S, and the internal space S may be filled with a sponge F or the like.

Fourth Embodiment

Next, a fourth embodiment will be described with reference to FIG. 13. The fourth embodiment relates to a detection device 101, which is different from the first embodiment. Configurations other than those described below are similar to those of the first embodiment.

Figure 13:
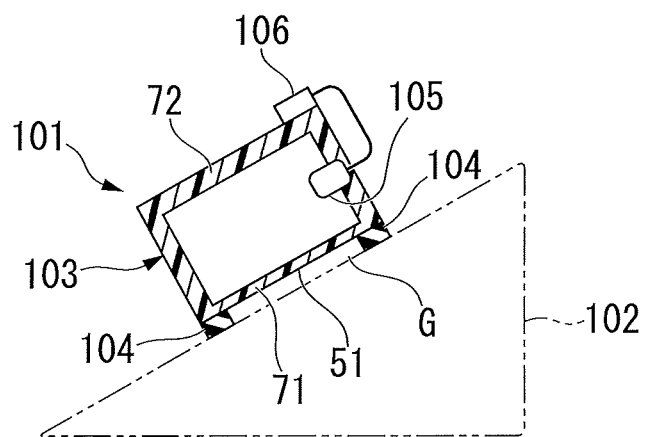
FIG. 13 is a cross-sectional view showing a detection device according to a fourth embodiment.

FIG. 13 is a cross-sectional view showing the detection device 101 according to the fourth embodiment. The detection device 101, for example, is formed as a separate body from an attachment target object 102 (hereinafter, simply referred to as an "attachment target object 102") of the detection device 101. The detection device 101 can be attached to the attachment target object 102 as an appendix by using a fixing mechanism (for example, a screw) not illustrated in the drawing. The attachment target object 102, for example, is a holding device 13 not including an internal sensor 34 and is not limited thereto. In this embodiment, an example will be described in which the detection device 101 is attached to a second face 52 of a first member 42 of the holding device 13.

The detection device 101, for example, includes a main body 103, legs 104, an internal sensor 34, and a radio circuit 106. The main body 103 is formed similar to the first member 42 of the first embodiment to have a rigidity. In other words, the main body 103 has such a rigidity that a vibration caused on the surface of the main body 103 is transferred to the inside of the main body 103. In this embodiment, the main body 103 includes an internal space S filled with a gas (for example, the air).

The legs 104 are attached to the ends of the first face 51 of the main body 103. The legs 104, for example, are formed of rubber. The legs 104 are interposed between the main body 103 and the attachment target object 102. In this way, a gap G is formed between the first face 51 of the main body 103 and the surface of the attachment target object 102. Here, the main body 103 may not include the legs 104 and be directly fixed to the attachment target object 102.

A first wall 71 of the main body 103 faces the attachment target object 102. A second wall 72 of the main body 103 faces in a direction different from that of the attachment target object 102. The first wall 71 is thinner than the second wall 72. Accordingly, the first wall 71 can be vibrated more easily than the second wall 72. Here, the first wall 71 may have a same thickness as that of the second wall 72 or may be thicker than the second wall 72.

In this embodiment, the main body 103 has the internal space S. At least part of the internal sensor 34 is arranged in the internal space S. The internal sensor 34 detects a vibration of a gas (for example, the air) disposed inside the internal space S. The radio circuit 106 is electrically connected to the internal sensor 34. The radio circuit 106 transmits a detection result acquired by the internal sensor 34 to the outside in a wireless manner.

When the attachment target object 102 vibrates, this vibration is propagated to the main body 103 through a gap G surrounded by the surface of the attachment target object 102, the first face 51 of the main body 103, and the legs 104. In other words, a vibration of the gas (for example, the air) disposed inside the gap G is caused by the vibration of the attachment target object 102. This vibration, similar to a stethoscope is transferred to the first face 51 of the main body 103 without leaking to the outside in accordance with the disposition of the legs 104. In this way, the first wall 71 of the main body 103 vibrates. Next, the vibration is propagated to the internal space S of the main body 103. The vibration is reflected on each inner face of the internal space S and forms a standing wave inside the internal space S. This standing wave is detected by the internal sensor 34. In this way, the internal sensor 34 of the detection device 101 can detect a vibration of the surface of the attachment target object 102.

According to such a configuration, by only attaching the detection device 101 to an existing holding member, the detecting function of the existing handling apparatus 1 can be improved from that time. The detection device 101 has a simple and inexpensive configuration and can be easily embedded in the handling apparatus as an appendix. In addition, in a case in which the radio circuit 106 is disposed in the detection device 101, a vibration can be wirelessly detected, and the detection device 101 can be more easily introduced to various fields, whereby the convenience is improved.

In this embodiment, the first wall 71 of the main body 103 is thinner than the second wall 72. According to such a configuration, the first wall 71 of the main body 103 can be easily vibrated. For this reason, in a case in which a vibration of the attachment target object 102 propagates to the first wall 71 of the main body 103, the vibration can be efficiently transferred to the internal space S. Accordingly, the sensitivity of detection of a standing wave of the internal space S using the internal sensor 34 is improved.

In this embodiment, the detection device 101 includes the legs 104, the main body 103 is attached to the attachment target object 102 via the legs 104, and a sealed space surrounded by the main body 103, the attachment target object 102, and the legs 104 is formed. In a case in which the main body 103 and the attachment target object 102 are directly bonded to each other, there are cases in which a vibration of the attachment target object 102 does not propagate well to the main body 103 due to a fine gap between the main body 103 and the attachment target object 102. In contrast to this, according to the configuration described above, the sealed space surrounded by the main body 103, the attachment target object 102, and the legs 104 is formed, and accordingly, a vibration caused on the attachment target object 102 can propagate up to the main body 103 through a vibration of a medium (for example, a vibration of the air) disposed inside the sealed space. In addition, by bonding the main body 103 and the attachment target object 102 to each other via the legs 104, compared to a case in which the attachment target object 102 and the main body 103 are directly bonded to each other, variations in the ways of bonding the main body 103 to various attachment target objects 102 are suppressed. In this way, variations in the propagation of a vibration depending on the surface structures and the bonding states of the attachment target object 102 and the main body 103 are suppressed. For this reason, also in a case in which machine learning is performed, variations in internal parameters can be suppressed.

The configuration of the detection device 101 is not limited to the example described above. For example, the leg 104 may be a thin bonding layer spread on part or all of the first face 51 of the main body 103. In such a case, unevenness, impurities, and the like of the surface of the main body 103 or the first member 42 are embedded in the bonding layer (for example a bonding layer of a curable resin), the vibration of the first member 42 can propagate to the main body 103.

In a case in which the attachment target object of the detection device 101 is formed of a material allowing a vibration to propagate up to the air on the periphery of a microphone, the microphone can detect a vibration of the material. In such a case, the detection device 101 can be used instead of an existing acoustic emission (AE) sensor. In other words, by attaching the detection device 101 to an object formed of a concrete material or the like instead of the AE sensor, acoustic emission due to crack propagation, abrasion, or the like of the object can be detected. In such a case, a replacement sensor that is more inexpensive than the AE sensor and can also acquire information other than the acoustic emission can be provided.

Fifth Embodiment

Next, a fifth embodiment will be described with reference to FIG. 14. In the fifth embodiment, the handling apparatus 1 includes a measurement system 111 that supports the determination of an initial value in the machine learning of a control model M2, which is different from the first embodiment. Configurations other than those described below are similar to those of the first embodiment.

Figure 14:
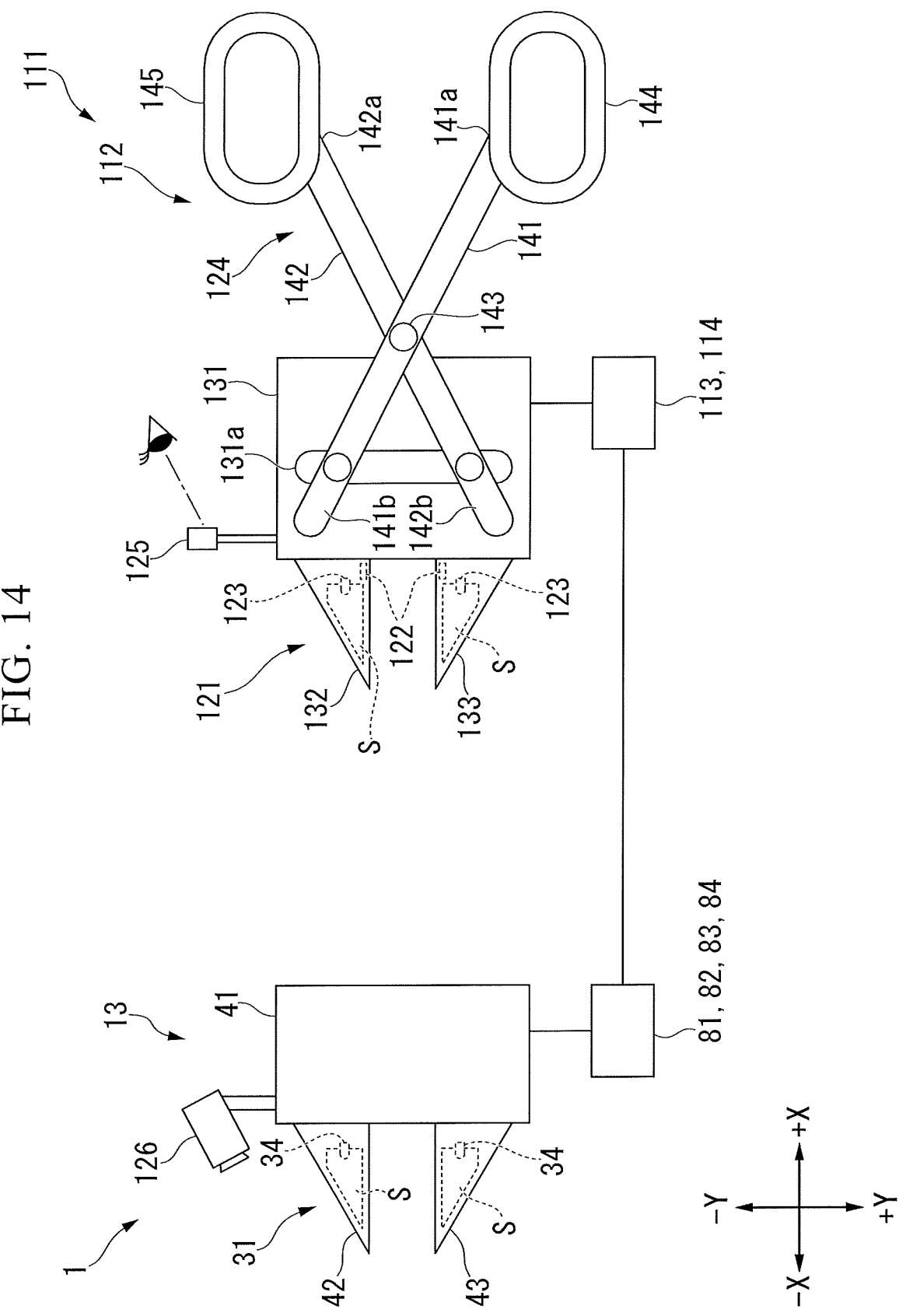
FIG. 14 is a side view showing a holding device and a measurement system according to a fifth embodiment.

FIG. 14 is a side view showing a holding device 13 and a measurement system 111 according to the fifth embodiment. In this embodiment, the handling apparatus 1 includes a measurement system 111 in addition to the configuration of the first embodiment. The measurement system 111 includes a measurement module 112, an initial value determiner 113, and a storage 114.

The measurement module 112, for example, includes a holder 121, a pressure sensor 122, an internal sensor 123, an operation unit 124, and an eye tracker 125. In addition, in this embodiment, the holding device 13 includes a finger image sensor 126.

The holder 121 is one example of "second holder." The holder 121 has configuration similar to the holder 31. The holder 121 includes a main body 131, a third member 132, and the fourth member 133. The main body 131, the third member 132, and the fourth member 133 respectively have configurations similar to the main body 41, the first member 42, and the second member 43 of the holder 31. For example, the third member 132 and the fourth member 133 have shapes, materials, mechanisms, and the degree of freedom of motion that are similar to those of the first member 42 and the second member 43.

The pressure sensor 122 detects a reaction force received by the third member 132 and the fourth member 133 from an object P in a case in which the object P is interposed between the third member 132 and the fourth member 133. For example, the pressure sensor 122 is a strain gauge attached to the third member 132 and the fourth member 133 but is not limited thereto. A user's operation for the operation unit 124 appears in a detection result acquired by the pressure sensor 122.

The internal sensor 123 is one example of "third sensor". At least part of the internal sensor 123 is arranged in the internal space S of the third member 132. The internal sensor 123, similar to the internal sensor 34 of the holding device 13, detects a vibration inside the third member 132.

The operation unit 124 can operates at least one of the third member 132 and the fourth member 133 by being used by a human hand. The operation unit 124, for example, has a shape imitating scissors and is attached to the holder 121. The operation unit 124 includes a first operation member 141 and a second operation member 142. The first operation member 141 and the second operation member 142 are connected to a pivot supporter 143 to pivot each other.

A first handle 144 is disposed at a first end 141a of the first operation member 141. In the main body 131, a slot 131a guiding the moving of the first operation member 141 is disposed. A second end 141b of the first operation member 141 is connected to the third member 132 through the slot 131a. Similar to the first operation member 141, a second handle 145 is disposed at a first end 142a of the second operation member 142. A second end 142b of the second operation member 142 is connected to the fourth member 133 through the slot 131a. When a user holds the first handle 144 and the second handle 145 and closes the operation unit 124 (in other words, the first handle 144 and the second handle 145 approach each other), the second end 141b of the first operation member 141 and the second end 142b of the second operation member 142 become closer to each other, and, in accordance with this, the third member 132 and the fourth member 133 are closed (in other words the holding force applied to an object P held between the third member 132 and the fourth member 133 is increased).

On the other hand, when the user opens the operation unit 124 (in other words, separates the first handle 144 and the second handle 145 away from each other), in accordance with this, the third member 132 and the fourth member 133 are open (in other words, the holding force applied to an object P held between the third member 132 and the fourth member 133 is decreased). The holding force for an object P is measured by the pressure sensor 122.

In the storage 114, detection results acquired by the pressure sensor 122 and the internal sensor 123 of the holder 121 in a practice test to be described later are stored. The storage 114 may be the same as the storage 114 according to the first embodiment or a storage disposed in another information processing apparatus other than the handling apparatus 1.

The initial value determiner 113 acquires an initial value for machine learning of the control model M2 on the basis of detection results acquired by the pressure sensor 122 and the internal sensor 123 stored in the storage 114. The "initial value" described here, for example, is a learned model that is prepared in advance (hereinafter, in a case in which a model of which learning has been completed is emphasized, it will be also referred to as an "initial value model").

The initial value model M0 is acquired through the following practice test using the measurement module 112. In this practice test, the measurement module 112 is operated by a user's hand, and an object P is held by the measurement module 112. In this practice test, in a case in which the user recognizes that the object P held between the third member 132 and the fourth member 133 deviates (for example, scrapes and drops), the user increases the holding force by closing the operation unit 124 such that there is no deviation in the object P. On the other hand, in a case in which the user recognizes that deformation leading to damage in the object P held between the third member 132 and the fourth member 133 may occur, the user decreases the holding force by opening the operation unit 124 such that deformation leading to damage in the object P does not occur. For example, the user performs the operation described while listening to a sound detected by the internal sensor 123 in real time. In this way, for various holding states of various objects P, by repeating recording of a detection result acquired by the internal sensor 123 and a user's operation corresponding thereto, many correspondence relations between detection results acquired by the internal sensor 123 and user's operations are acquired. In addition, for an object of which the handling method is not familiar, measured values of a case in which the user damages the object P, a case in which the user drops the object P, and a case in which the user succeeds in gripping the object P for a predetermined time are recorded and are set as information of the initial value model.

The initial value determiner 113 registers detection results acquired by the internal sensor 123 and user's operations corresponding thereto, which have been collected in this way, as the initial value model M0. This initial value model M0 includes information indicating a next motion of the holder 31 (for example, a degree of the holding force to be increased or a degree of the holding force to be decreased) in a case in which a certain sound (for example, certain vibration) is caused in the holder 31.

In addition, for deriving the initial value model M0, in addition to the detection results acquired by the pressure sensor 122 and the internal sensor 123, detection results acquired by the image sensor 14, the loading sensor 15, the pressure sensor 33, and the like may be used as input information.

In this embodiment, the controller 16 of the handling apparatus 1 uses the initial value model M0 acquired by the above operation as the initial value of the control model M2. Then, the controller 16 corrects the initial value model M0 through the machine learning as described above, thereby deriving a superior control model.

In addition, in this embodiment, when the initial value model M0 is acquired, the eye tracker 125 may be used. The eye tracker 125 is mounted in a user who handles the operation unit 124 and measures a user's visual line. When the eye tracker 125 is used, it can be known that a portion of the holder 121 observed by the user determining the statuses of the holder 121 and the object P and performing an operation. In this way, it can be known which portion of the image information acquired by the image sensor 14 and the finger image sensor 126 is focused in monitoring by a person. In other words, by specifying an area in which the user's visual lines are concentrated, a target area of the images acquired by the image sensor 14 and the finger image sensor 126 for monitoring presence/absence of a change and a change inside the target area that is used for determination can be specified. Accordingly, pixels that are not important for determination do not need to be calculated, and the calculation load can be suppressed to be low.

In this embodiment, the initial value determiner 113 takes in information of a target area to be monitored and a change to be monitored inside the target area, which are acquired by using the eye tracker 125, as part of the initial value model M0.

According to such a configuration, a person's actual operation can be simulated by the handling apparatus 1. In other words, in this embodiment, the measurement system 111 is included. By using such a measurement system 111, an operation pattern at the time of a person's gripping of an object P can be acquired from the pressure sensor 122. A holding algorithm that is the same as that of a human is assembled by using the operation pattern acquired in this way, and the operation of a robot is controlled on the basis of a human's operation pattern, whereby the handling apparatus 1 operating with the same senses as those of a human (in other words, capable of performing the same motion as that of a human) is realized. The operation of a robot device operating on the basis of sensor information, generally, is not necessarily predictable for a human. For example, such a robot device abruptly operates while it seems that the robot stops, or the robot does not operate while being predicted to operate. On the other hand, the handling apparatus 1 according to this embodiment, compared to a general robot device, there is high predictability. By providing an algorithm of "if–then" similar to that of a human for the handling apparatus 1, the handling apparatus 1 operating with the same senses as those of a human can be realized.

In this embodiment, the measurement system 111 includes the initial value determiner 113 that determines the initial value used for machine learning relating to the control of the holding device 13 on the basis of a detection result output from the internal sensor 123. According to such a configuration, as the initial value of the machine learning, a human's experimental processing algorithm can be employed. In this way, compared to a case in which an optimal parameter is retrieved while performing machine learning by simply repeating an actual holding operation and task, the experiment conditions to be reviewed can be decreased. In a case in which there are many types of used sensors and a high degree of freedom in the motion of an actuator, while vast combinations of experiment conditions are reviewed and are prepared as an initial value, and a vast number of experiments are necessary, it is substantially difficult to completely automatically perform such data classification and arrangement. On the other hand, according to the configuration of this embodiment, by suppressing calculator's experimental setting of a threshold and the like to decrease the processing load of the CPU, the versatility of the handling apparatus can be further improved.

In addition, in a case in which an operation of a human performed for certain information when an unknown object P is stably held is checked and is employed as an initial value, even in a case in which an unknown object P is held, by applying the same algorithm for a similar object P, the success rate of holding and conveying is markedly increased. By performing such a process, the handling apparatus 1 can respond to various objects P, and accordingly, it is more efficient and effective than a case in which a precise physical model is built for each object P. In addition, by sequentially performing reinforcement learning by repeating the determination of dropping, deformation, and the like using the initial value based on a human's operation as a start point, an algorithm that is similar to a human's holding method but is more reliable than that of a human can be found.

In this embodiment, the measurement system 111 includes the eye tracker 125 that measures a visual line of a human operating the operation unit 124. According to such a configuration, an area focused by a human performing determination and gripping at the time of gripping becomes clear. In this way, when a robot performs recognition of an object P, an area to be focused in image processing becomes clear, and accordingly a useless calculation process can be reduced. In addition, by associating various objects P and holding states with visual line information, areas focused by a human in certain cases can be classified.

MODIFIED EXAMPLE

Figure 15:
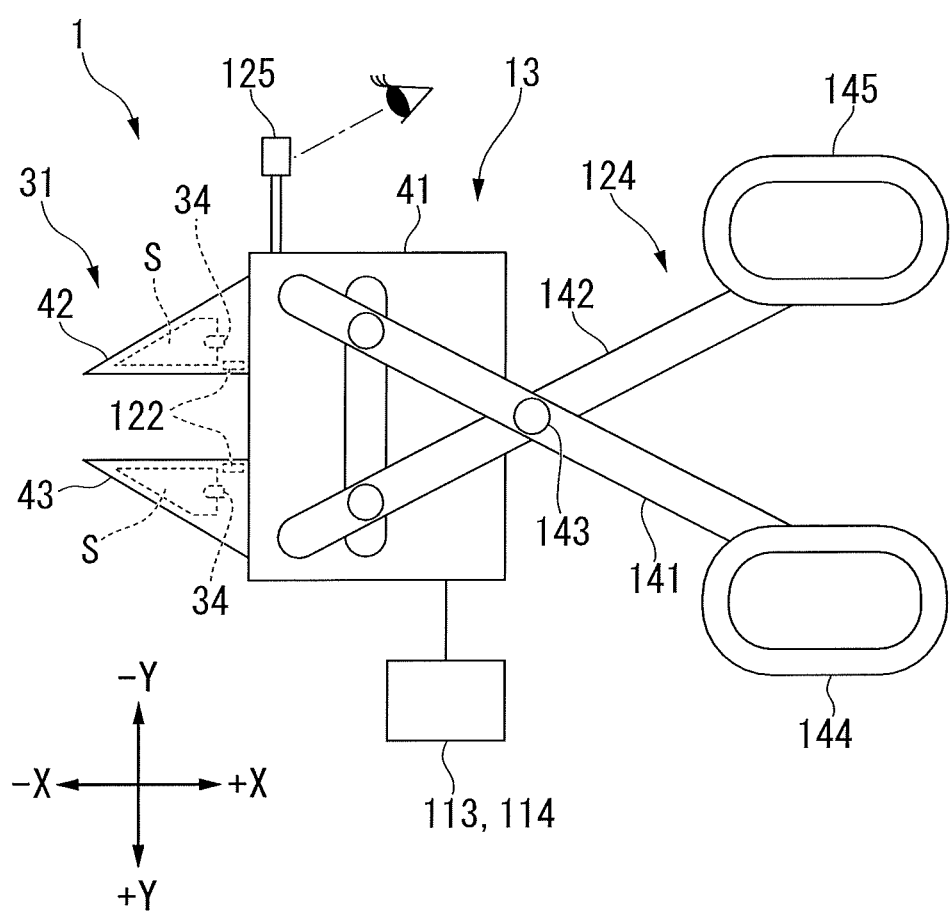
FIG. 15 is a side view showing a holding device and a measurement system according to a modified example of the fifth embodiment.

FIG. 15 shows a modified example of the fifth embodiment. In a handling apparatus 1 according to this modified example, by attaching an operation unit 124 to the holding device 13 instead of the measurement module 112, the holding device 13 can be used as the measurement module 112. The operation unit 124 allows at least one of the first member 42 and the second member 43 to be operated by a human's hand. According to such a configuration, similar to the fifth embodiment, the initial value model M0 can be acquired.

Sixth Embodiment

Next, one reference form will be described with reference to FIGS. 16 to 19. This reference embodiment relates to a training device 151 that can use data acquired by the measurement system 111 described in the fifth embodiment.

Figure 16:
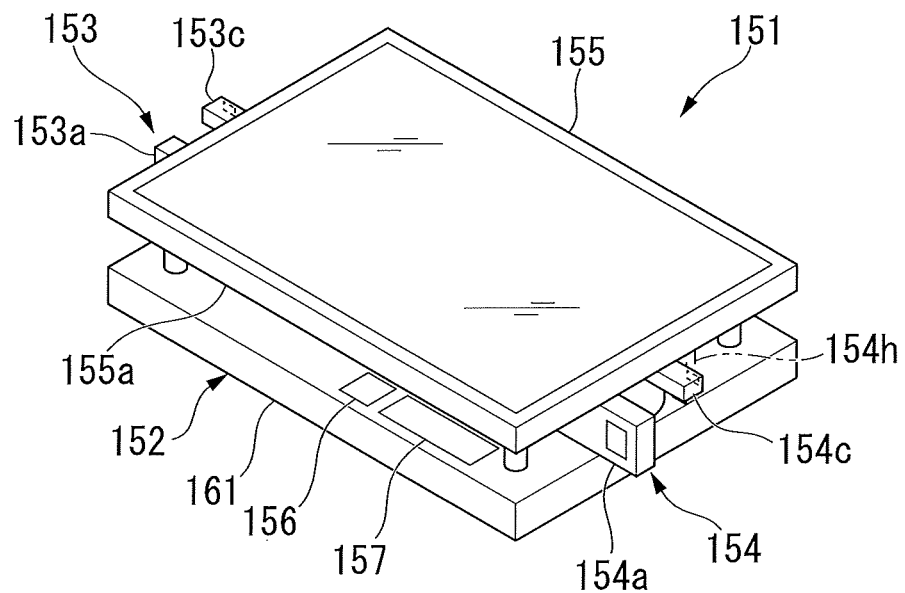
FIG. 16 is a perspective view showing a training device of a reference embodiment.

FIG. 16 is a perspective view showing the training device 151 of the reference form. Here, "training device" broadly represents a device that is used for performing training for improving a muscle strength and muscle endurance. In addition, "training" described here includes rehabilitation.

Figure 17:
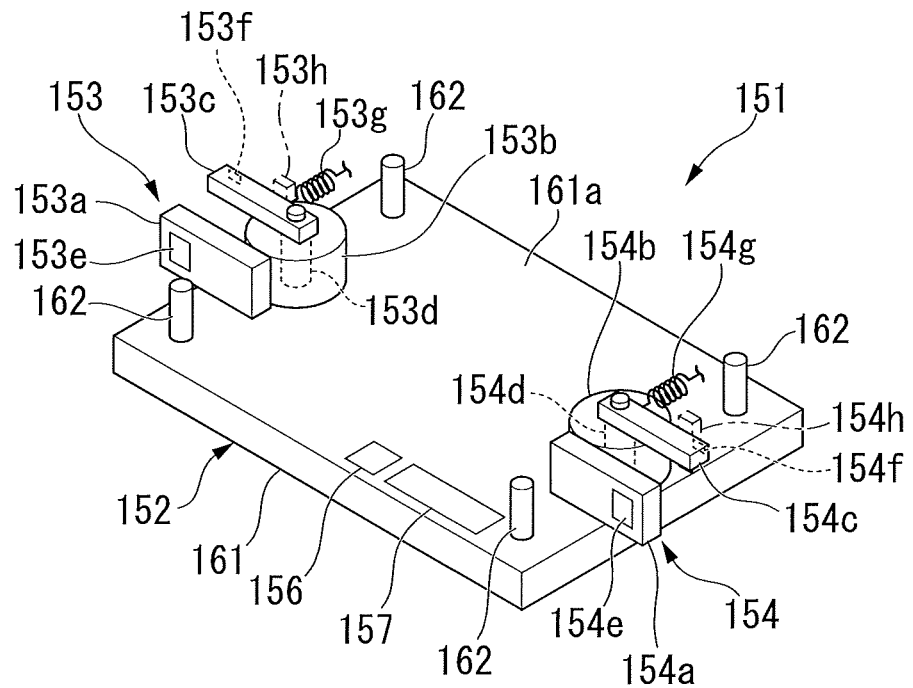
FIG. 17 is a perspective view showing a training device of the reference embodiment in a state in which a display is detached.
Figure 18A:
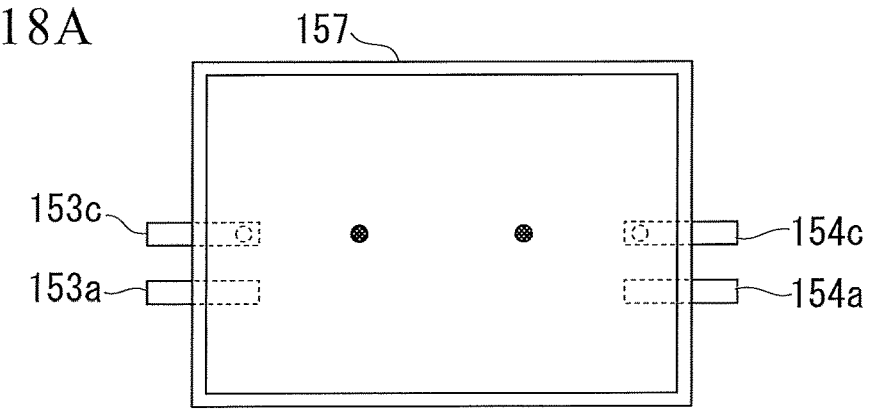
FIGS. 18A to 18D are diagrams showing displays of the training device of the reference embodiment in each stage of use.
Figure 18B:
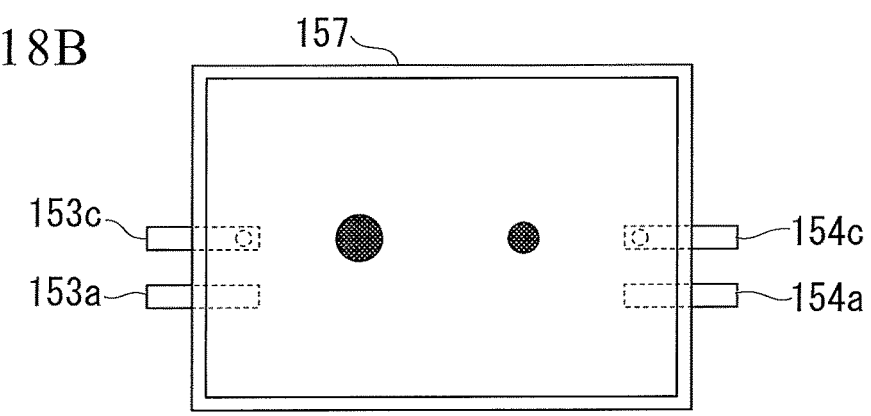
Figure 18C:
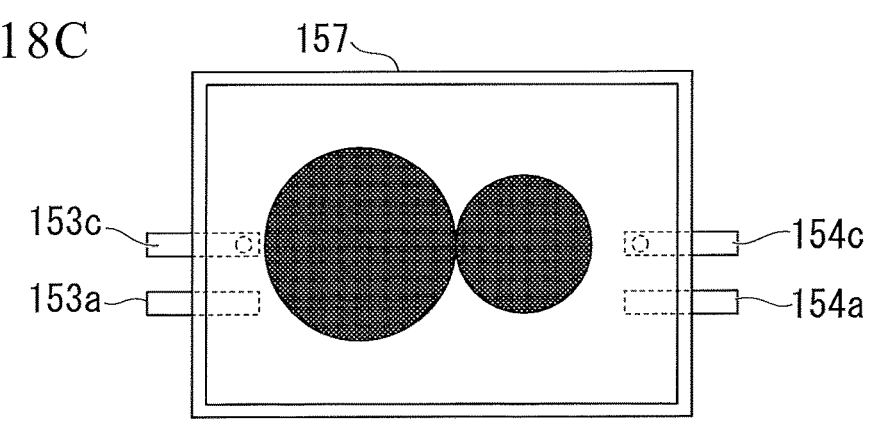
Figure 18D:
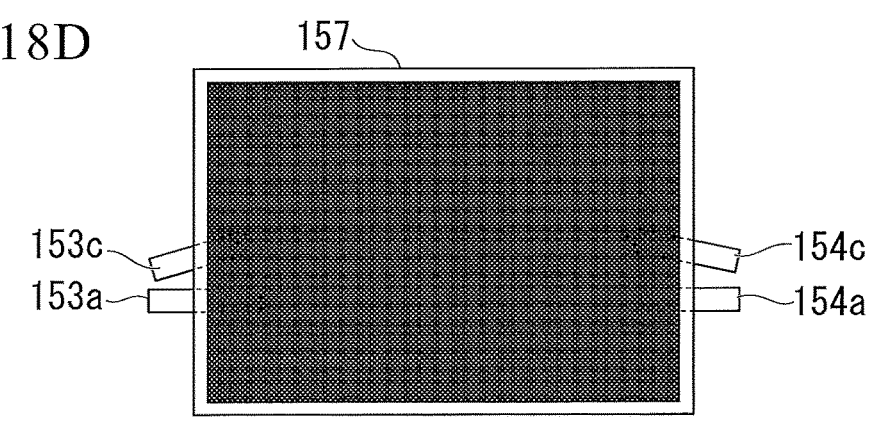

The training device 151 includes: a base 152; a first operation unit 153; a second operation unit 154; a display 155; a storage 156; and an information processor 157. FIG. 17 is a perspective view showing the training device 151 of the reference embodiment in a state in which the display 155 is detached. Here, "base" is an arbitrary base member functioning as a support body of at least one different constituent element.

The base 152 supports the first operation unit 153, the second operation unit 154, and the display 155. The base 152 includes a plate-shaped base 161 and four connectors 162. The connectors 162 protrude from four corners of the upper face 161a of the base 161 to the upper side. The connectors 162 are combined with the lower face 155a of the display 155 and connect the base 161 and the display 155. In addition, the connectors 162 have connection terminals for electrically connecting the information processor 157 and the display 155 such that the information processor 157 and the display can exchange information thereof.

The first operation unit 153 is disposed on a first side of the upper face 161 of the base 161. The first operation unit 153 includes a first fixing member 153a, a first rotation member 153b, and the first moving member 153c. The first fixing member 153a is fixed to the base 161. At least part of the first fixing member 153a protrudes from the side edge of the base 161 to the left side in FIG. 16. The first rotation member 153b is attached to the upper face 161a of the base 161 to be rotatable within a plane parallel to the upper face 161a of the base 161. The first moving member 153c is fixed to the first rotation member 153b. At least part of the first moving member 153c protrudes from the side edge of the base 161 to the left side in FIG. 16. Accordingly, as illustrated in FIG. 16, the front ends of the first fixing member 153a and the first moving member 153c protrude from between the base 161 and the display 155 to the left side in FIG. 16. For example, the user can hold the first operation unit 153 by placing the thumb of the left hand along the first fixing member 153a (for example, front side) and placing the index finger of the left hand along the first moving member 153c (for example, back side).

In a state in which an external force is not applied, the first moving member 153c is drawn in a direction separating away from the first fixing member 153a by a weak spring 153g to be substantially in parallel with the first fixing member 153a and is arranged in a state of bumping a stopper 153h (hereinafter, this arrangement will be referred to as "initial arrangement"). When a force directed toward the first fixing member 153a is applied to the first moving member 153c (in other words, when a force is applied to the first moving member 153c such that the first moving member 153c approaches the first fixing member 153a), the first rotation member 153b can rotate together with the first moving member 153c. The first rotation member 153b includes a first electromagnetic brake 153d. In the initial arrangement, when the first electromagnetic brake 153b operates, even a user applies a force to the first moving member 153c, the first rotation member 153b and the first moving member 153c are fixed and are not moved. The user performs a pinching operation to be described later in this state. When the first electromagnetic brake 153b is released (i.e., stops the operation), the fixing of the first rotation member 153b and the first moving member 153c are released as well. In such a case, when the user applies a force to the first moving member 153c, the first moving member 153c rotates toward the side of the first fixing member 153a. When the external force is removed after rotating the first rotation member 153b and the first moving member 153c, the first rotation member 153b is rotated in the reverse direction together with the first moving member 153c by the weak spring 153g to be returned to the initial arrangement.

At least one of the first fixing member 153a and the first moving member 153c includes a pressure sensor. In this embodiment, on the front-side face of the first fixing member 153a and the back-side face of the first moving member 153c, pressure sensors 153e and 153f are disposed. Such pressure sensors 153e and 153f can measure the magnitudes of pressures applied to the first fixing member 153a and the first moving member 153c by the user.

The second operation unit 154 has a configuration similar to the first operation unit 153 and is arranged on the base 161 to have horizontal symmetry with respect to the first operation unit 153. The second operation unit 154 includes a second fixing member 154a, a second rotation member 154b, and a second moving member 154c, and these respectively correspond to the first fixing member 153a, the first rotation member 153b, and the first moving member 153c. As illustrated in FIG. 16, the front ends of the second fixing member 154a and the second moving member 154c protrude between the base 161 and the display 166 to the right side in FIG. 16. For example, the user can hold the second operation unit 154 by placing the thumb of the right hand along the second fixing member 154a (for example, front side) and placing the index finger of the right hand along the second moving member 154c (for example, back side).

Similar to the first operation unit 153, in a state in which an external force is not applied, the second moving member 154c is drawn in a direction separating away from the first fixing member 154a by a weak spring 154g to be substantially in parallel with the second fixing member 154a and is arranged in a state of bumping a stopper 154h (hereinafter, this arrangement will be referred to as "initial arrangement"). Similar to the first rotation member 153b, the second rotation member 154b includes a second electromagnetic brake 154d. Similar to the first electromagnetic brake 153d, in the initial arrangement, when the second electromagnetic brake 154b operates, even a user applies a force to the second moving member 154c, the second rotation member 154b and the second moving member 154c are fixed and are not moved. The user performs a pinching operation to be described later in this state. When the second electromagnetic brake 154b is released, the fixing of the second rotation member 154b and the second moving member 154c are released as well. In such a case, when the user applies a force to the second moving member 154c, the second moving member 154c rotates toward the side of the second fixing member 154a.

Similar to the first operation unit 153, at least one of the second fixing member 154a and the second moving member 154c includes a pressure sensor. In this embodiment, on the front-side face of the second fixing member 154a and the back-side face of the second moving member 154c, pressure sensors 154e and 154f are disposed.

The display 155 is connected to the base 161 by the connector 162 above the first operation unit 153 and the second operation unit 154. As will be described later, the display 155 displays black circles in accordance with the states of the first operation unit 153 and second operation unit 154.

The storage 156 stores information used by the training device 151. For example, the storage 156 stores measurement results (for example, a database in which an object P that is a measurement target, a pressure value detected by the pressure sensor 122, and image data of the object P detected by the image sensor 14 are listed up) of a series of human's gripping operations acquired by the measurement system 111 described in the fifth embodiment. Such a database may be output from the measurement system 111 and stored in the storage 156 of the training device 151 in advance before training.

The information processor 157 controls the display 155, the first electromagnetic brake 153d, and the second electromagnetic brake 154d in accordance with the states of the first operation unit 153, the second operation unit 154, and the display 155. The information processor 157, in the initial arrangement, operates the first electromagnetic brake 153d and the second electromagnetic brake 154d. Accordingly, the first electromagnetic brake 153d fixes the first rotation member 153b and the first moving member 153c not to rotate. In addition, the second electromagnetic brake 154d fixes the second rotation member 154b and the second moving member 154c not to rotate. The information processor 157 changes a display on the display 155 on the basis of detection results from the pressure sensors 153e, 153f, 154e, and 154f. For example, in a case in which pressure is detected by the pressure sensors 153e and 153f of the first operation unit 153, the information processor 157 performs control of the display 155 such that a small black circle is displayed on the left side of the display 155. Similarly, in a case in which pressure is detected by the pressure sensors 154e and 154f of the second operation unit 154, the information processor 157 performs control of the display 155 such that a small black circle is displayed on the right side of the display 155. When the values of pressures detected by the pressure sensors 153e and 153f of the first operation unit 153 become large, the information processor 157 performs control of the display 155 such that the black circle displayed on the left side of the display 155 is enlarged. On the other hand, when the values of pressures detected by the pressure sensors 153e and 153f become small, the information processor 157 performs control of the display 155 such that the black circle displayed on the left side of the display 155 is contracted. When the values of pressures detected by the pressure sensors 154e and 154f of the second operation unit 154 increases or decrease, the information processor 157 performs control of the display 155 such that the black circle displayed on the right side of the display 155 is enlarged or contracted in accordance therewith. For example, the diameters of the black circles may be approximately linearly changed for the pressures detected by the pressure sensors 153e, 153f, 154e, and 154f.

In a case in which the values of the pressures of the pressure sensors 153e, 153f, 154e, and 154f increase, and the black circle on the left side and the black circle on the right side are brought into contact with each other on the display 155, the information processor 157 performs control of the display 155 such that the display 155 is darkened. Substantially simultaneously with this, the information processor 157 releases the first electromagnetic brake 153d and the second electromagnetic brake 154d (in other words, forms a state in which the brakes are not operated). In this way, the first rotation member 153b and the first moving member 153c can rotate toward the side of the first fixing member 153a. In addition, the second rotation member 154b and the second moving member 154c can rotate toward the side of the second fixing member 154a.

A relation between the values of the pressures of the pressure sensors 153e, 153f, 154e, and 154f and the diameters of the black circles (for example, in a case in which the value of the pressure and the diameter of the black circle have a substantially linear relation, the slope of the straight line), for example, can be appropriately set through an input to the information processor 157. For example, the slope of the straight line may be set in accordance with the physical strength, the muscle strength, and the object of the training, and the like of a user performing training. Alternatively, a pressure threshold of the pressure sensors 153e, 153f, 154e, and 154f that are necessary for darkening the screen (in other words, the black circle on the left side and the black circle on the right side are brought into contact with each other) may be input. In this case, the relation between the values of the pressures of the pressure sensors 153e, 153f, 154e, and 154f and the diameters of the black circles may be automatically set such that the black circle on the left side and the black circle on the right side are brought into contact with each other in a case in which the detected pressure arrives at the pressure threshold. In addition, the information processor 157 may gradually change the relation between the value of the pressure and the diameter of the black circle every time when the process of generation of black circles to the darkening of the display 155 (hereinafter, referred to as a "circle collapsing training") is repeated. For example, every time when the circle collapsing training is repeated, the information processor 157 may decrease the slope of the straight line of a case in which the value of the pressure and the diameter of the black circle have an approximately linear relation. In such a case, higher pressure is necessary for darkening the display 155.

Next, the method of using the training device 151 will be described with reference to FIGS. 18 to 19. FIG. 18 is a diagram showing displays in the display of the training device 151 in each stage at the time of use. FIG. 19 is a flowchart showing the flow of training performed by the training device 151.

First, the user holds the first operation unit 153 using the left hand and holds the second operation unit 154 using the right hand (S501). When a gripping force is applied to the first operation unit 153 and the second operation unit 154, one small black circle is displayed on each of the left side and the right side of the display 155 (S502; stage (a) in FIG. 18). Next, as the user increases the gripping force (S503: Yes), the circles on the display 155 are enlarged in accordance therewith (S504; stage (b) in FIG. 18). For example, in a case in which the user increases only the force of the left hand, only the circle on the left side of the display 155 is enlarged. On the other hand, in a case in which the user decreases the gripping force, the circles on the display 155 are contracted in accordance therewith. In a case in which the user does not change the gripping force (S503: No), the sizes of the circles on the display 155 do not change. While the circles on the left and right sides are not brought into contact with each other on the display 155 (S505: No), the sizes of the circles are continuously changed in accordance with the magnitude of the user's gripping force. However, when the user continuously increases the gripping force, and the circles on the left and right sides are finally brought into contact with each other (S505: Yes, a stage (c) in FIG. 18), the display 155 is darkened (S506; a stage (d) in FIG. 18). Almost simultaneously, the first electromagnetic brake 153d and the second electromagnetic brake 154d are released. Accordingly, the first rotation member 153b and the first moving member 153c rotate toward the side of the first fixing member 153a, and the second rotation member 154b and the second moving member 154c rotate toward the side of the second fixing member 154a.

The configuration described above is one example of the screen display pattern in the training device 151. Here, the "screen display pattern" represents the flow of a series of screen displays displayed on the display 155 in accordance with forces applied to the first operation unit 153 and the second operation unit 154 in the training device 151. For example, such a screen display pattern may be designed on the basis of information representing human's handling of various objects P. Such information, for example, can be acquired by the measurement system 111 described in the fifth embodiment. Hereinafter, one example of the flow of generating a screen display pattern on the basis of user's operation information acquired by the measurement system 111 will be described.

The information processor 157 takes out a database of user's operation information stored in the storage 156. For example, the database includes information of the kind of the object P, the user's gripping force (for example, a pressure value detected by the pressure sensor 122) measured for the object P, image data of the object P detected by the image sensor 14, and the like. For example, in the database, a series of user's gripping forces for a certain object P is associated with a series of image data acquired by imaging the holding states of the object P held by the holder 121.

For example, the information processor 157 can generate a screen display pattern on the basis of the database. For example, in a case in which the pressure sensors 153e, 153f, 154e, and 154f detect pressures, the information processor 157 retrieves a pressure value closest to an average value of the detected pressures of the pressure sensors 153e, 153f, 154e, and 154f from the database. Next, the information processor 157 displays image data of an object P associated with the pressure value on the display 155. In a case in which the pressures detected by the pressure sensors 153e, 153f, 154e, and 154f change, the information processor 157 retrieves a pressure value closest to an average value of the pressures after the change among the pressure values for the same object P listed in the database from the database. Next, the information processor 157 displays image data of the object P associated with the pressure value on the display 155. In this way, the information processor 157 can display the image of the actual object P corresponding to the user's gripping force during training on the display 155. For example, in a case in which the pressures of the pressure sensors 153e, 153f, 154e, 154f are too high, an image in which the object P is likely to be deformed is displayed on the display 155. For example, in a case in which the pressures of the pressure sensors 153e, 153f, 154e, 154f are too low, an image in which the object P is likely to drop is displayed on the display 155.

The information processor 157 can appropriately select an object P inside the database in accordance with the object value of the user's training. Here, the "training object value" is an object value set for achieving a user's object (for example, reinforcement of the muscle strength, rehabilitation, or the like) in consideration of the physical strength, the muscle strength, and the like of the user performing training. For example, the training object value is represented as a value of the grip strength. For example, in a case in which the training object value is high, the information processor 157 selects a hard object P, a heavy object P, other like. On the other hand, in a case in which the object value of training is low, the information processor 157 selects a soft object P, a light object P, or the like. In addition, the information processor 157 can update the training object value during user's training on the basis of the database of the user's operation information at any time.

Other than the pressure data and the image data, by using a detection result acquired by the eye tracker 125 or the like, for each of various objects P, a portion of the object P watched by the user, a level of the gripping force, a factor causing to determine a failure or end of motion, a level of the gripping force required to deform the object P, and the like can be configured as a database. Accordingly, in addition to the image display pattern described above, various image display patterns can be generated.

According to such a configuration, a user performing training can naturally accept the method of the circle collapsing training. For example, the circle collapsing training can be accepted by a user more easily than a case in which the training device 151 is set to darken the display 155 in a case in which the user applies a force having a magnitude that is the predetermined threshold or more to the first operation unit 153 and the second operation unit 154. In other words, the circle collapsing training causes a user to have an interest and to repeatedly perform training independently. In addition, the circle collapsing training is patterned and thus can cause the user to perform the same exercise by giving the same direction to the user.

Furthermore, in the circle collapsing training, even when there is no detailed descriptive direction to the user such as "Please increase power until circles are brought into contact with each other", "When the circles are brought into contact with each other, please decrease the power", and "Please try again", the user can easily perceive the training method. For this reason, the user's recognition load can be reduced. In other words, by using the visual information displayed on the display 155, a user's gripping behavior and grip strength can be controlled in a range of some degrees without applying a load to the user.

The configuration described above can be regarded as a training device using human senses. In other words, in order to visually recognize and grip an object, a human performs exercise by performing a recognition process of a feedback system and a feed forward system on the basis of information such as a visual sense, a tactile sense, a sense of power, and the like. In order for a human to store a rule of exchange with a new target object under a new environment, it is considered that the feed forward system strongly works by referring to past exercise experiences. A mental model used for a recognition process of the feed forward system is a model that is built by individuals through reinforcement learning inside the brains in the past. As a behavior of actual target object is different much from this model, a human has a relatively strong impression such as surprise, fear, moving, or the like and updates the mental model. However, compared to children, adults already have sufficiently various mental models and tend to stop motion for an extremely new stimulus (in other words, a stimulus that cannot be understood). For this reason, it is difficult to motivate adults to perform new exercise. However, by taking the reciprocal of this structure, by intentionally designing information accepted by a human such as situations, atmosphere, and five senses to some degrees and to cause a user to accept the information, it is considered to be possible to extract another reaction required for completing an existing mental model (for example, a conditional biological reaction such as "it is expected to be" or a sociological reaction accompanying emotions such as "have seen it before" or "want to touch").

The circle collapsing training uses a mental model using a metaphor of a balloon representing that the circle is enlarged in accordance with power. On the other hand, by using the measurement system 111 described above, many mental models other than the metaphor of a balloon of the circle collapsing training can be generated. By using this, the convenience of the training device can be improved. In other words, according to the model described above, a training device capable of appropriately changing a training object value such that the training object value is slightly below the exercise ability of a user (i.e., a person performing training) can be provided. In this way, a user can be allowed to repeatedly perform operations of inputting power of arbitrary magnitude and relaxing to take a rest without hardship. The initial value of the training object value may be a value set by a trainer or a value according to power that can be exhibited by a user (for example 60% of power that can be exhibited by the user). In a case in which the training device described above is used as a rehabilitation device or the like, the initial value of the training object value may be a value directed by a physical therapist. By setting the value directed by the physical therapist as the initial value of the training object value, a safe and effective operation can be performed. In addition, the objective value of the training may be appropriately changed in accordance with the user state or the like. For example, the training object value is gradually increased from the initial value.

In addition, the shape and the structure of the first member 42 are not limited to the example described above. For example, the first member 42 may have an arbitrary shape that can hold an object P such as an approximate rectangular parallelepiped shape or an approximate cylindrical shape. In addition, the surface of the first member 42 may not necessarily be a plane but be an arbitrary curved face. For easy holding of an object P, a cavity, a protrusion, or the like for holding may be disposed on the first face 51, and any other arbitrary holding mechanism may be disposed. In addition, the first member 42 may be a gripping member having a joint.

In the embodiments and modified examples described above, the determiner 81, the driving controller 83, and the learner 84 of the controller 16 and the initial value determiner 113 of the measurement system 111, and the information processor 157 of the training device 151 are realized, for example, as a processor such as a central processing unit (CPU) or a graphics processing unit (GPU) executes a program stored in a program memory. However, all or part of such functional units may be realized by hardware (for example, a circuit; circuitry) such as a large scale integration (LSI), an application specific integrated circuit (ASIC), or a field-programmable gate array (FPGA). In addition, the storages 82, 114, and 156 are realized by a flash memory, an electrically erasable programmable read-only memory (EEPROM), a read-only memory (ROM), a random access memory (RAM), and the like.

According to at least one embodiment described above, by disposing an internal sensor detecting a vibration inside a high rigidity member, the object holding ability can be improved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A holding device comprising:
   a first holder comprising a first member and a second member, the first holder being configured to hold an object by interposing the object between the first member and the second member, the first member including an internal space that is sealed; and
   a first sensor in the first member, the first sensor being a microphone configured to detect a vibration as a sound, at least part of the microphone being in the internal space.

2. The holding device according to claim 1, wherein
   the first member has a rigidity allowing a vibration caused on a surface of the first member to be transmitted as a sound to the inside of the first member, and
   the microphone detects the sound transmitted to the inside of the first member.

3. The holding device according to claim 1, wherein
   the microphone detects a sound caused inside the first member due to a vibration caused on a surface of the first member.

4. The holding device according to claim 1, wherein
   the internal space is filled with a gas, and the first sensor detects a vibration of the gas in the internal space as the sound.

5. The holding device according to claim 4, wherein the internal space is a resonance space that amplifies a vibration caused on a surface of the first member as the vibration of the gas in the internal space by resonance, and
the microphone detects the vibration of the gas amplified by resonance in the internal space.

6. The holding device according to claim 1, wherein the internal space is sealed.

7. The holding device according to claim 1, wherein
the first member has a first face and a second face, the first face is configured to face the object, and the second face is different from the first face,
the first member has a first thickness between the first face and the internal space and a second thickness between the second face and the internal space,
the first thickness is thinner than second thickness, and
a width of the internal space in a direction crossing the first face is larger than the second thickness.

8. The holding device according to claim 1, wherein
the first member has a first face, and the first face is configured to face the object,
the internal space has a first inner face, a second inner face, and a third inner face, the first inner face is substantially parallel to the first face, the second inner face is positioned on a side opposite to the first inner face in the internal space, and the third inner face is different from the first inner face and the second inner face, and
the first sensor is attached to the third inner face and detects a sound reflected on the first inner face and the second inner face.

9. The holding device according to claim 1, further comprising
a plurality of second sensors each of which is a microphone capable of detecting a vibration as a sound, wherein
the first member has a first face, and the first face has a plurality of holes and is configured to face the object, and
the plurality of second sensors are disposed in the internal space and face the plurality of holes.

10. The holding device according to claim 1, wherein
the first member has a first face, and the first face is configured to face the object, and
the first face has a surface roughness that is rougher than at least part of the first holder.

11. The holding device according to claim 1, wherein
the first holder is configured to hold, as the object, a packaged article or a device component.

12. The holding device according to claim 1, wherein
the microphone is inside the first member, the microphone is not being exposed to the outside of the first member.

13. The holding device according to claim 1, wherein
the first member has a first face, and the first face is configured to face the object, and
a length of the internal space in a first direction along the first face of the first member is a half or more of a maximum length of the first member in the first direction.

14. The holding device according to claim 13, wherein
a width of the internal space in a second direction that is different from the first direction is a half or more of a maximum width of the first member in the second direction.

15. A handling apparatus comprising:
a holding device comprising a first holder, a first sensor, and a driver, the first holder comprising a first member and a second member, the first holder being configured to hold an object by interposing the object between the first member and the second member, the first member including an internal space that is sealed, the first sensor in the first member, the first sensor being a microphone configured to detect a vibration as a sound, at least part of the microphone being in the internal space, the driver being configured to drive at least one of the first member and the second member; and
a controller configured to change control of the driver on the basis of a detection result output from the microphone in a case where a vibration is caused in the first member.

16. The handling apparatus according to claim 15, wherein
the controller controls the driver such that a force of the first holder holding the object is increased in a case where a vibration of a first type is detected by the microphone and controls the driver such that the force of the first holder holding the object is decreased in a case where a vibration of a second type is detected by the microphone, and the vibration of the second type is different from the vibration of the first type.

17. The handling apparatus according to claim 16, wherein
the vibration of the first type is a vibration caused in a case where the object deviates from the first member, and
the vibration of the second type is a vibration caused in a case where deformation leading to damage is caused in at least one of the object and the first member.

18. The handling apparatus according to claim 15, wherein
the controller comprises a learner, and the learner is configured to learn a determining model used for determining a holding state of the first holder for the object through machine learning on the basis of a detection result output from the first sensor.

19. The handling apparatus according to claim 18, further comprising a measurement system,
the measurement system comprising:
a second holder comprising a third member, a fourth member, and an operation unit, the operation unit being configured to operate at least one of the third member and the fourth member by being used by a human hand, the second holder being configured to hold the object by interposing the object between the third member and the fourth member; and
a third sensor in the third member, the third sensor being configured to detect a vibration.

* * * * *